United States Patent
Olson

(10) Patent No.: US 7,625,166 B2
(45) Date of Patent: Dec. 1, 2009

(54) MULTI-FUNCTION TRAILER APPARATUS

(75) Inventor: Gerald L. Olson, 4373 Kingston Rd., Duluth, MN (US) 55803

(73) Assignee: Gerald L. Olson, Duluth, MN (US)

( * ) Notice: Subject to any disclaimer, the term of this patent is extended or adjusted under 35 U.S.C. 154(b) by 409 days.

(21) Appl. No.: 11/065,528

(22) Filed: Feb. 24, 2005

(65) Prior Publication Data
US 2005/0191143 A1 Sep. 1, 2005

Related U.S. Application Data

(60) Provisional application No. 60/547,482, filed on Feb. 25, 2004.

(51) Int. Cl.
*B60P 1/64* (2006.01)
(52) U.S. Cl. .................. 414/498; 414/469; 414/376; 280/33.998; 280/411.1
(58) Field of Classification Search ........... 280/33.998, 280/411.1; 414/376, 469, 498
See application file for complete search history.

(56) References Cited

U.S. PATENT DOCUMENTS

| | | | | |
|---|---|---|---|---|
| 2,009,654 A | 7/1935 | Fleet | .......................... | 280/33.1 |
| 2,793,774 A | 5/1957 | Lovegreen | .................. | 214/505 |
| 2,797,008 A | 6/1957 | Banker | ....................... | 214/505 |
| 2,830,718 A | 4/1958 | Havins | ......................... | 214/84 |
| 3,097,755 A | 7/1963 | Fulcher | ....................... | 214/505 |
| 3,228,546 A | 1/1966 | Bunch | ........................ | 214/505 |
| 3,305,117 A | 2/1967 | Ford | ........................... | 214/515 |
| 3,375,947 A | 4/1968 | Kissilov | ...................... | 214/674 |
| 3,743,121 A | 7/1973 | Langer | ...................... | 214/44 R |
| 3,784,230 A | 1/1974 | Worrall, Jr. | .................. | 280/491 |
| 4,126,324 A | 11/1978 | Browning | ..................... | 280/42 |
| 4,505,619 A * | 3/1985 | Sargent | ....................... | 405/220 |
| 4,655,671 A * | 4/1987 | Pratt | ........................... | 414/477 |
| 4,792,274 A * | 12/1988 | Cockram | ..................... | 414/537 |
| 4,859,133 A | 8/1989 | Maria | .......................... | 414/462 |
| 4,995,129 A | 2/1991 | Comardo | ..................... | 14/71.1 |
| 5,257,894 A | 11/1993 | Grant | .......................... | 414/537 |
| 5,764,511 A | 6/1998 | Henderson | ............. | 364/167.01 |
| 5,769,449 A | 6/1998 | Keesee | ........................ | 280/656 |
| 5,934,695 A * | 8/1999 | Rowland | ............... | 280/33.998 |
| 6,149,369 A * | 11/2000 | Reed | ........................... | 414/480 |
| 6,241,438 B1 * | 6/2001 | Corbett et al. | ................. | 410/56 |
| 6,378,893 B1 | 4/2002 | Jager | .......................... | 280/656 |
| 6,536,064 B1 * | 3/2003 | Swink et al. | .................. | 14/69.5 |
| 7,185,911 B1 * | 3/2007 | Leverett | ...................... | 280/656 |
| 2003/0222431 A1 | 12/2003 | Crosby et al. | ............... | 280/656 |

* cited by examiner

*Primary Examiner*—Michael S Lowe
(74) *Attorney, Agent, or Firm*—John D. Veldhuis-Kroeze; Westman, Champlin & Kelly, P.A.

(57) ABSTRACT

A trailer apparatus configured to be pulled behind a first vehicle includes a first or larger trailer and a second or smaller trailer. The first or larger trailer is configured to be pulled behind the first vehicle. The second or smaller trailer is configured to fit into the first trailer. The first or larger trailer can be used to haul a smaller vehicle, such as an ATV, snowmobile or other recreational vehicle, and the second trailer can be removed from the first trailer so that it can be towed behind the smaller vehicle as a stand-alone trailer. The second trailer can also be configured to form a ramp for the first trailer to aid in loading the first trailer.

9 Claims, 18 Drawing Sheets

MULTI-FUNCTION TRAILER APPARATUS

The present application is based on and claims the benefit of U.S. provisional patent application Ser. No. 60/547,482, filed Feb. 25, 2004, the content of which is hereby incorporated by reference in its entirety.

FIELD OF THE INVENTION

The present invention relates to trailers. More particularly, the present invention relates to trailers for hauling recreational or other small motorized vehicles or other loads.

BACKGROUND OF THE INVENTION

Small motorized vehicles are widely used for hunting, fishing, trail riding, and other recreational activities. They are also frequently used in law enforcement, conservation, lawn care, farming, and other work related activities. Examples of such small motorized vehicles include snowmobiles, four wheelers and other all terrain vehicles (ATVs), lawn and other small tractors, etc. Owners of these small vehicles typically haul the small vehicle to desired unloading destinations using a trailer towed by a larger vehicle such as a truck, sports utility vehicle (SUV), etc.

Once hauled to the desired unloading destination, the small vehicle is unloaded from the trailer and readied for use. Often times, it would be useful to also have a smaller trailer which could be hauled behind the small vehicle after it has been unloaded from the larger trailer. For example, for ice fishing or hunting, it is common to haul a snowmobile or ATV to an unloading destination using a large trailer (large enough to carry the snowmobile or ATV). Once at the unloading destination (for example the shore of a frozen lake or a heavily wooded area), the snowmobile or ATV is driven to a more remote location, taking along any gear or equipment which can be carried by the driver or on the vehicle.

In many instances, it would be very useful to pull a small trailer behind the snowmobile or ATV to allow the driver to haul more equipment to the remote location. However, getting a small trailer to the unloading destination along with the snowmobile or ATV results in many challenges and inconveniences. For example, to haul the smaller trailer on the larger trailer presents numerous challenges, including how to get the small trailer loaded on top of the larger trailer, and the fact that the large trailer will have to be even larger to carry both the small vehicle and the small trailer. Alternatively, hauling the small trailer behind the larger trailer can be very difficult for the driver to safely accomplish, and can even be illegal in many states or areas.

A trailer apparatus which overcomes one or more of the above-described problems, or which provides other advantages over the prior art, would be a significant improvement.

SUMMARY OF THE INVENTION

A multi-function trailer is provided which includes a large trailer and a small trailer which fit together when it is desired to move both the large and small trailers as a single unit, along with one or more ATV's, snowmobiles, other small vehicles or other cargo. When desired, for example after hauling an ATV or snowmobile to a desired location, the trailers can be easily decoupled providing fast access to the stand alone small trailer. The small trailer can then be pulled behind the ATV or snowmobile. Also, in some embodiments, the large trailer can be used on its own without the small trailer inside.

In some embodiments the small trailer slides inside the larger trailer, into a position under the large trailer's deck. In other embodiments, the small trailer couples to the large trailer in a manner which allows the deck of the small trailer to become part of the deck of the larger trailer (or stated another way part of a deck of a composite trailer). The designs of the present invention allow the small trailer to be used as a loading ramp for loading the large trailer (or a composite trailer). The small trailer is then conveniently, and in a user friendly manner, either fit into the large trailer, or coupled to the large trailer to form a composite trailer.

The designs and concepts of the present invention provide advantages over the prior art. These include the ability for a user to quickly and easily remove the small trailer from the large trailer for its individual use, without the need to disassemble and/or re-assemble any major components. This allows a user of an ATV, snowmobile or other hauled machine to have access to a trailer of suitable size for use with that hauled machine. Numerous alternative design choices are possible without departing from the spirit and scope of the invention.

Other features and benefits that characterize embodiments of the present invention will be apparent upon reading the following detailed description and review of the associated drawings.

DETAILED DESCRIPTION OF ILLUSTRATIVE EMBODIMENTS

I. Overview

Figure 1:
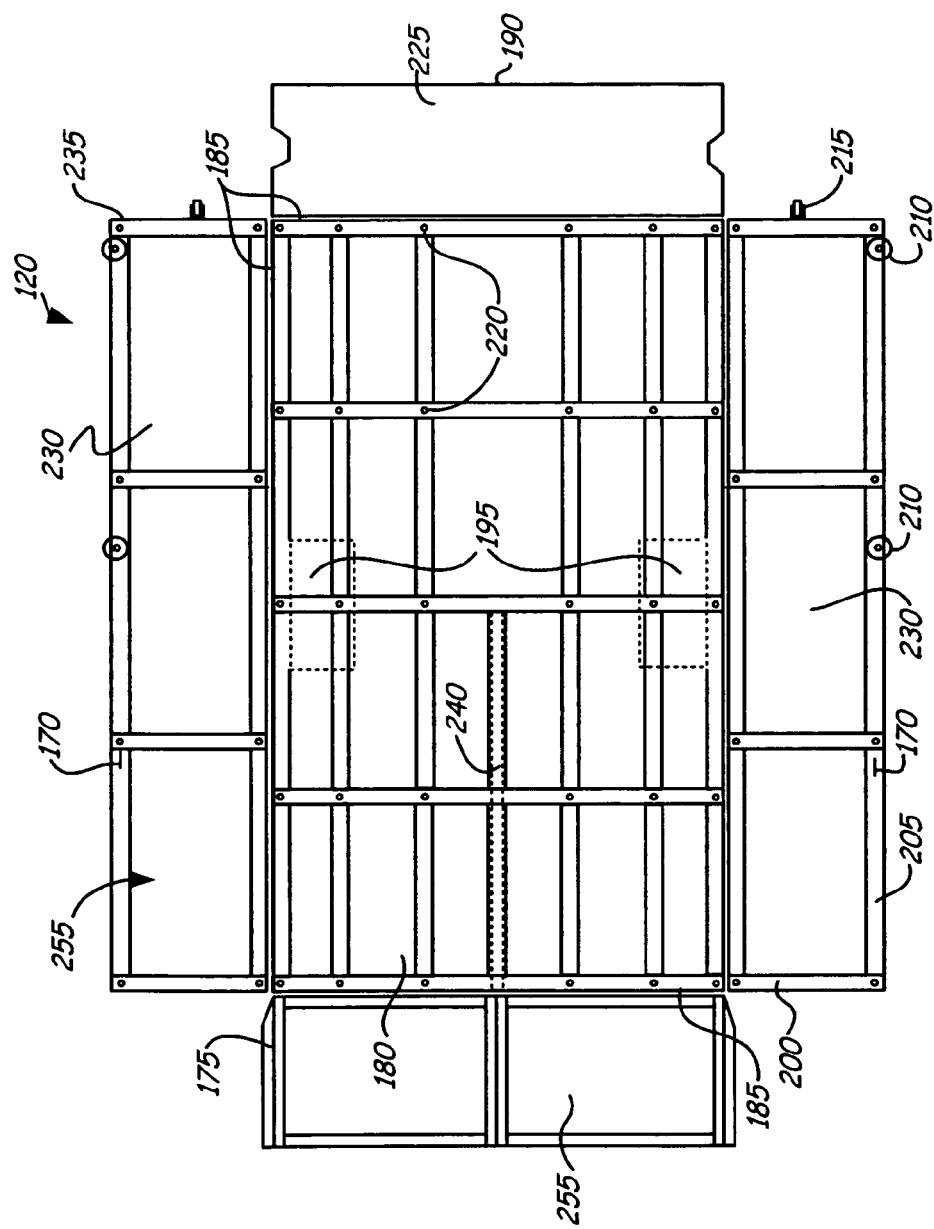
FIG. 1 is a diagrammatic illustration of certain features of a smaller trailer of a trailer apparatus having both the smaller trailer and a larger trailer.

The present invention includes a multi-function trailer 100 which includes a large trailer 110 and a small trailer 120 which fit together when it is desired to move both the large and small trailers as a single unit, along with one or more ATV's, snowmobiles, other small vehicles or other cargo. When desired, for example after hauling an ATV or snowmobile to a desired location, the trailers 110 and 120 of the composite trailer 100 can be easily decoupled providing fast access to the stand alone small trailer 120. The small trailer 120 can then be pulled behind the ATV or snowmobile. Also, in some embodiments, the large trailer 110 can be used on its own without the small trailer 120 inside.

In some embodiments the small trailer 120 slides inside the larger trailer 110, into a position under the large trailer's deck. In other embodiments, the small trailer couples to the large trailer in a manner which allows the deck of the small trailer to become part of the deck of the larger trailer (or stated another way part of a deck of a composite trailer). As illustrated in the FIGS. and corresponding description, the designs of the present invention allow the small trailer 120 to be used as a loading ramp for loading the large trailer 110 (or a composite trailer 100). The small trailer is then conveniently, and in a user friendly manner, either fit into the large trailer, or coupled to the large trailer to form a composite trailer.

The present invention is a multi function trailer 100 with respect to the fact that it is a trailer within a trailer. Example embodiments of the multi-function trailer 100 are provided with reference to the FIGS., using specific dimensions, materials, etc. These dimensions and materials are provided as exemplary embodiments, but do not limit the invention to any particular dimensions or materials. Those of skill in the art will recognize that the dimensions and materials can be varied as desired for particular designs, uses, etc.

In an example embodiment, the two-in-one or composite trailer 100 features an 8'6"×10' large or parent trailer 110 with a stand alone 42"×6' smaller trailer 120. In one embodiment, the smaller trailer 120 is an aluminum trailer with 14" sides, front, and rear gate. In addition, this small trailer 120 has a slide out tongue for storage purposes and has four wheel/axle height settings. This small trailer was designed to follow perfectly behind an ATV, but could very easily be towed by a snowmobile, lawn tractor, or other motorized vehicle. When the small trailer 120 is not being used it is stored inside of the large or parent trailer 110. This is accomplished due to the fact that the large trailer is designed so that it has a storage area (5'×6'×3" in one embodiment) in between the base frame and upper frame. A system of rollers on both the small and large trailers makes loading easy. This large trailer 110 also has a hand winch 150 which can pull the small trailer 120 into the compartment of the large trailer 110 if desired.

Figure 4:
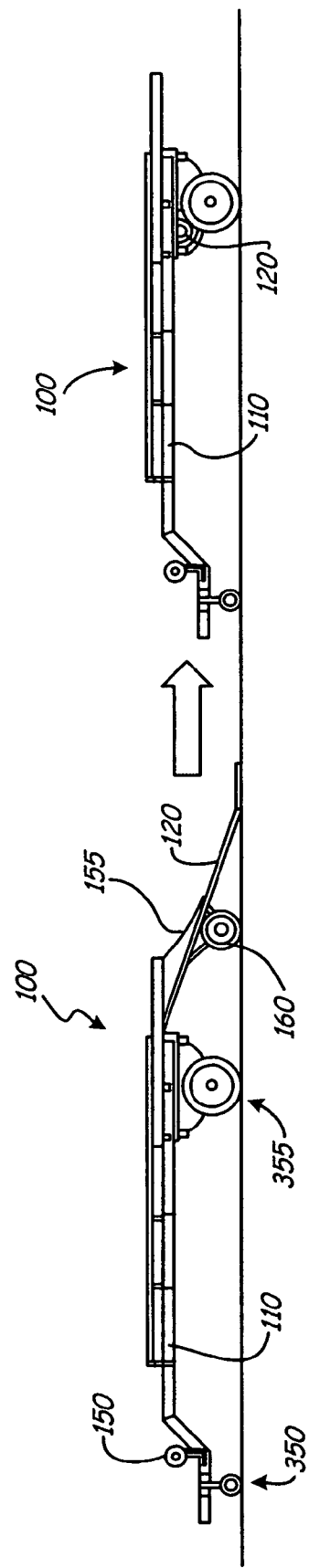
FIG. 4 is a diagrammatic side view illustration of how the smaller trailer acts as a loading ramp for the larger trailer and then fits into the larger trailer for towing.

From a side view of large trailer 110, for example as provided in FIG. 4, one would not easily be able to tell that there is another trailer inside. On the left, FIG. 4 illustrates the small trailer 120 being used as a loading ramp for the large trailer 110, and on the right this FIG. Illustrates the small trailer 120 stored inside of the large trailer 110. Being able to have a full sized (e.g., 8'6"×10' in one embodiment) trailer without using up any space for another sled, trailer, etc. on the loading deck of that trailer is a significant advantage over the prior art.

As described above, in some embodiments an important feature of the small trailer 120 is that it doubles as a ramp for the parent (large) trailer 110. In some embodiments such as the one illustrated in FIG. 4, two chains 155 attach the large trailer 110 to the small trailer 120 when in ramp mode to make for safe, easy on/off loading of a motorized vehicle. The adjustable axle/wheel height adjustment also helps in the safety/sturdiness of ramp feature.

The small trailer's wheels 160 lock in a position where they are taking some of the load being exerted on the ramp. In some exemplary embodiments, the conversion of the small trailer from ramp to usable trailer is as easy as 5 locking pins and a pull release handle. When the small trailer 120 is done being used as a ramp, it just needs to be pulled/rolled free from large trailer 110, and have its sides, back, and front gate fold up into each other. With the locking pins dropped in place, the trailer sides are ready. At that point, all that is left is to the slide out the tongue and put the locking pins into locking holes. The last step would be to tilt the trailer back on tailgate slightly and pull the rope handle near the tongue. The wheel/axle locking device is then free and wheels/axles will slide into one of four positions of ones choosing. Simply let go of handle and wheels/axles lock in place.

This invention solves the problem of not being able to haul two motorized vehicles and gear, yet be able to haul said gear or other supplies with your motorized vehicle in an easy to maneuver fashion. As stated previously this two in one multi-trailer can be used in conjunction with snowmobiles, also. Skis, instead of wheels, can be mounted on the small trailer or wheels/tires attach to skis.

In one example embodiment, skis were attached to the axle of small trailer 120. Without limiting the present invention, other specific construction information for this example embodiment are provided as follows:

The large trailer 110 was constructed out of various size steel tubes, and angles. The small trailer 120 was constructed mainly of aluminum to reduce weight and ease of use. Either trailer could be built in similar fashion out of either steel, aluminum, or other materials. In addition, said descriptions are what were used for this particular application, but leaves room for design changes in both size, location, or amount of items/materials used. The basic design concept is of a stand alone trailer of useful size being able to load into another large trailer.

In addition, the small trailer is built in such a manner as to make it easy to use for towing, to use as a ramp, to use for loading, or for all three of these functions. A second design is also provided, using the same concepts as original, with the exception that the large trailer 110 is a single place trailer and the small trailer 120 becomes part of the 'large trailer's useable deck. This design is also steel construction. The same design small trailer would be used with the single place trailer.

II. Detailed Example Embodiments

Referring again to the FIGS., provided is a description of implementation details in accordance with some exemplary embodiments. It will be understood by those of skill in the art that these implementation details are provided for illustrative purposes, and do not limit the invention to particular dimensions, materials, or other implementation details.

Referring first to FIG. 1, shown is a top view of small trailer 120 in accordance with one embodiment. As described above, this trailer can be used for a ramp attached to parent (large) trailer 110 with two chains 155 (shown in FIG. 4). These chains are attached to small trailer 120 at eyebolts 170 located on each side of the small trailer as shown in FIG. 1. In this drawing the small trailer 120 is in the unfolded, or loading position and is in this position when used as a ramp, also.

When trailer 120 is actually loaded, one more step would be needed. This would be front gate 175 would need to be folded on top of small trailer deck 180. This is easily accomplished due to the fact that it attached via hinges 185. The rear gate 190 is folded onto deck 180 prior to setting up small trailer 120 as a ramp. When trailer 120 is in the ramp/loading position, the tires/axles are also in the ramp/loading position. The tires would be on the ground, and smaller trailer 120 would be resting on them at wheel stops 195. In one embodiment, these are two 1½"×6" angle pieces attached to 1½" angle cross members 200. In other embodiments, wheel stops 195 can be substituted with a number of other things. The wheel stops are important in some embodiments because they allow the weight of the ATV, snowmobile, or other motorized vehicle to be transferred to the wheels. This will reduce stress on the 1½" tube 205 which is part of the frame.

Other parts on this drawing used for the loading of the small trailer 120 into the large (parent) trailer 110 are as follows: rollers (for example 1¾" diameter rollers) 210 which are used for guiding the small trailer into the large trailer. They are attached inside of tube 205 on both outside edges of the small trailer sides. These rollers allow for easy loading into the large trailer due to the fact that they ride on side rails of the large trailer. The other part which is used in loading is rollers (for example, 1¼" diameter rollers) 215. Two rollers are mounted on angle cross members 200 in the rear of the trailer. These two rollers also are used in guiding the small trailer 120 into the large trailer 110. They ride on two pieces of flat bar installed into the large trailer 110. Although these two types of rollers were used in this application, different sizes and/or slides could be used in other locations on the small trailer frame. As far as the wheel/axle positioning: it was not shown in this drawing, but will be described with reference to FIG. 2.

The main use for the small trailer is to be towed by an ATV, snowmobile, or other motorized vehicle. Its design takes into account the need for a versatile, yet practical trailer which is large enough, yet not too large to be easily towed by a recreational sized vehicle. In one embodiment, the construction of this trailer is as follows:

The main from is constructed of tubes 205 (for example 1½" diameter tubes, 6' long). These are attached using ⅜" carriage bolts 220 to 1½" angle cross members 200. These can be aluminum to help reduce weight. Steel could be used if desired. The trailer sides are also built in the same fashion. In this example embodiment, the sides are 14½" in height and are covered with aluminum plates 225 which are ⅛" thick. The sides 230 are attached to the main frame using hinges 185 (for example, 3" hinges), as are the front and rear gate. The front gate 175 is constructed using 1" angle. This is also covered with aluminum plates 225. The rear gate 190 is just a single aluminum plate 225. The aluminum plate 225 in all applications for the small trailer was either bolted, or riveted to the frame. When trailer 120 is in use for towing, the sides 230, as well as the front and rear gates 175 and 190 are up. The corners are attached using corner locking pin inserts/slots 235 with a locking pin.

The final part not yet described in FIG. 1 is tube 240 (for example a 1½" square tube) with a tube slide out tongue (for example a 1" square tube slide out tongue). These two items are made out of steel for added strength, although aluminum could be used if desired. The 1½" square tube 240 is attached to all three 1½" angle cross members 200 with ⅜" bolts in the center front of the small trailer. Not shown in this drawing is the wheel/axle assembly and locking device for wheel/axle stabilizers. These will be described with reference to FIG. 2.

Also not shown is in FIG. 1 is trailer decking. For decking, in one embodiment, trailer 120 includes expanded aluminum for traction when used as a ramp. Other materials can be used if desired. In one embodiment, the overall size of small trailer 120 is 42"×6' when used as a trailer, and 60½"×86½" when laid out (sides 230 and gates 175 and 190 in down position) prior to being used as a ramp.

Figure 2:
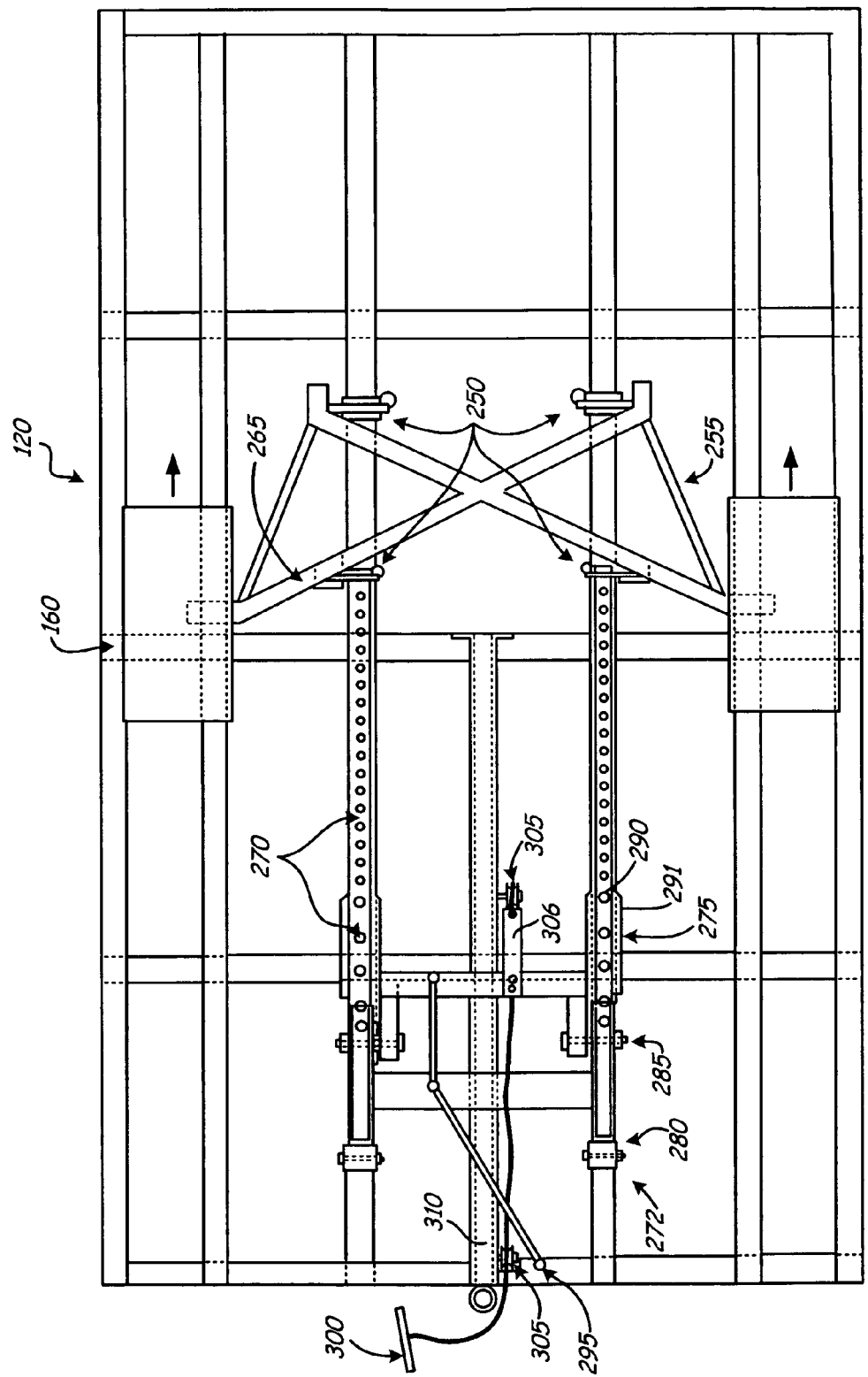
FIG. 2 is a diagrammatic illustration of other features of the smaller trailer shown in FIG. 1.

Referring now to FIG. 2, shown is the underside (bottom view) of small trailer 120. Shown at 250 are the pivot points for the axle assembly and the axle stabilizers. In one example embodiments, the axle assembly is attached to the trailer with two ¾" steel rods run through brackets which are then bolted to the frame. The axle rods 255 extend all the way up to the wheels and rims (collectively shown at 160). When the axle rods 255 are run through the brackets they are held in place with hitch pins. The axle assembly also has a 1" square tube crossing axle supports 265 to opposite corners for added strength.

Attached to the axle supports 265 are ⅜" diameter posts and brackets used to hold 1" square tube axle stabilizers 270. The stabilizers 270 are held onto ⅜" diameter posts with hitch pins. This creates the second pivot point 250 of the axle assembly. On the front of the trailer is the spring loaded locking device 275. This device locks the axle stabilizers 270 and axle assembly at a desired height. In an example embodiment, the locking device is two ¼" square tubes supported by a 1"×3" tube welded to both 1¼" tubes. These square tubes allow the axle stabilizers 270 to slide out or in. At 280, shown is the pivot point where the locking device 272 is attach to the trailer with tabs which bolt to trailer frame with ⅜" bolts. In this example embodiment, the locking device 272 is steel. At 285, shown is the hinge point for the actual locking mechanism. In one embodiment, the mechanism includes two ¾" square tubes, 5" long, which are welded to a 15½" long piece of 1½" angle.

In the example embodiment, at either end of this angle are two 2"×6½" pieces of flat bar 291. Locking pins/studs 290 are located at the rounded end of the flat bar 291 in FIG. 2. These two studs insert into axle stabilizers 270 in one of 5 holes on each stabilizer. These ½" holes are actually different height adjustments for the wheel/axles. The actual mechanism which was just described is attached at hinge point 285 using two ⅜"×3¾" bolts.

Figure 3:
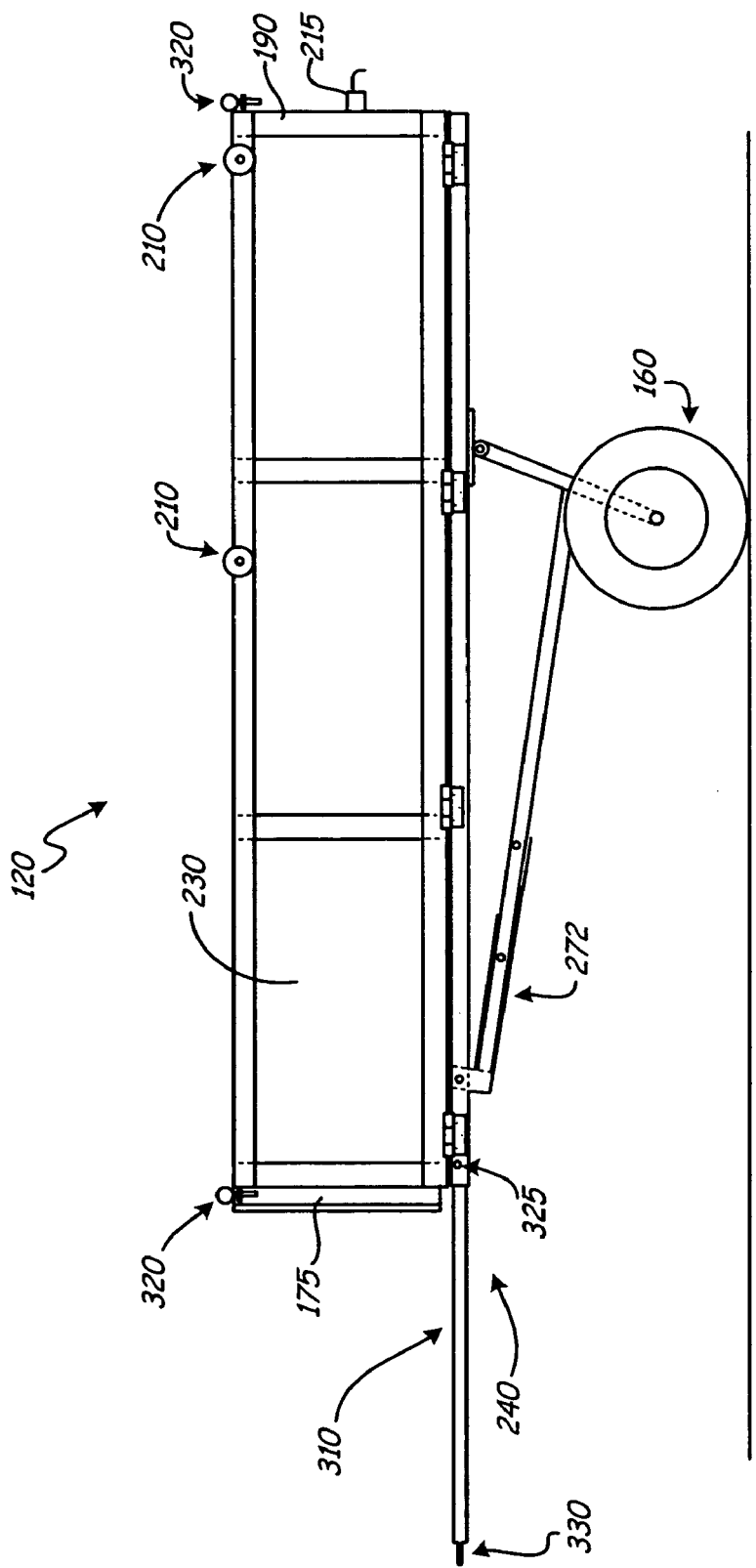
FIG. 3 is diagrammatic side view illustration of the smaller trailer.

Also shown in FIG. 2 are washers to allow for free movement. The locking mechanism locks into axle stabilizers 270 due to the spring 295 attached to mechanism and to the front of trailer frame. When spring 295 is attached to the mechanism it is in the locked position, which in turn locks the stabilizers and axles in place. The locking device is easily disengaged by pulling on rope and handle 300. This rope used for releasing the locking device runs over two pulleys 305 and attaches to a 5" tab 306 attached to 1½" angle on the locking mechanism. Shown at 310 is the underside view of the slide out tongue. In an example embodiment, this tongue 310 slides out 26" and locks either in or out using a pin as shown in FIG. 3. In one example, all parts shown in FIG. 2 are steel construction for added strength, but could be aluminum or other material if desired.

Referring next to FIG. 3, shown is a side view of the small trailer 120, configured in its trailer mode. Shown at 320 are the locking corner pins, which were referred to above. These pins hold the front gate 175 and tailgate 190 to the sides 230. Pins were used for this application, but the same result could be achieved in a number of ways. Rollers 210 and 215 described with reference to FIG. 1 are also shown in FIG. 3. Slide out tongue 310 is shown extended and ready for trailer use. The locking pin 325 is used as described above to lock the tongue in both the extended as well as retracted states.

The coupler 330 shown in FIG. 3 can be a 1½" eyebolt in this application. Shown at 272 is the locking device for the wheel/axle stabilizers. The position of the axles in this drawing are set at the highest position. In one embodiment, there are three other lower positions which could be chosen. The lowest being used for loading, and as a ramp. A number of other couplers for hooking up tongue 310 to the motorized vehicle could be used as well.

Referring next to FIG. 4, shown is a is a diagrammatic illustration of the large trailer 110 of the composite or combined trailer 100, with the small trailer 120 in the ramp, or loading position. Also shown in this diagram (at the right) is the large trailer 110 after the small trailer 120 is loaded inside. Some of the features of this drawing are as follows:

Shown at 350 is a rolling tongue jack.

Shown at 150 is the hand winch used in the loading of the small trailer. The winch strap runs through a 1"×2" tube in the center of large trailer. The hook on the end attaches onto the tongue of the small trailer. When the winch is cranked the small trailer slides inside the large trailer.

Shown at 355 are 18" tires and rims for the large trailer.

Shown at 155 are the chains which were discussed above with reference to FIG. 1. These attach from the large to the small trailer when used as a ramp. The chains prevent the small trailer from moving while vehicles are being loaded onto the large trailer.

Figure 5:
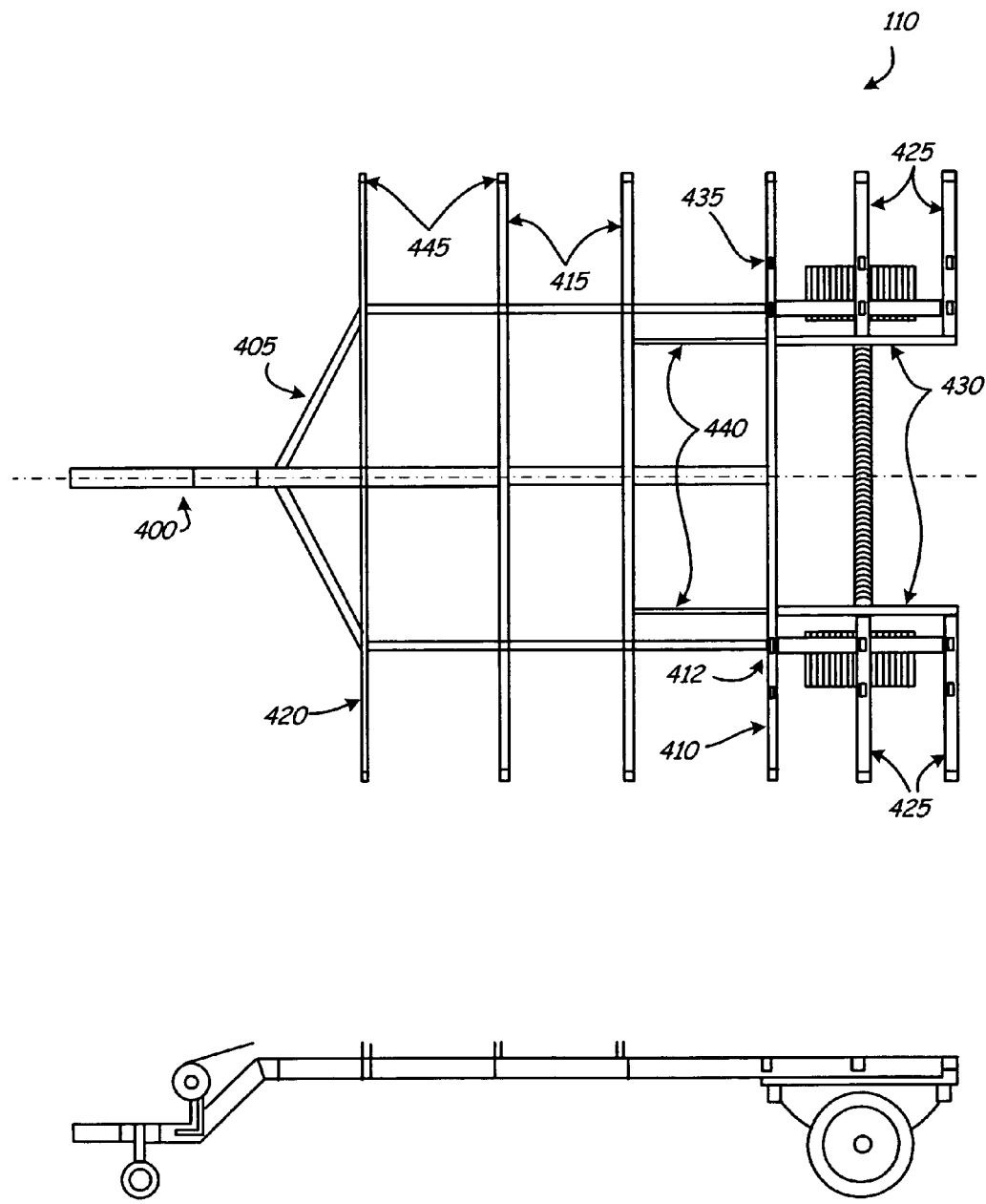
FIG. 5 is a diagrammatic illustration of certain features of the larger trailer.

Referring now to FIG. 5, shown is the base frame of the large trailer 110 and also a few components which aide in the loading feature for the small trailer. Shown at 400 is a 3" square tube that provides the main structure of the trailer, along with 2"×3" tube 405, and is a continuous run to the rear of the trailer. In these example embodiments, these items are all welded together.

Another item for the overall structure is 1½" square tube 410, which connects tube 405 to tongue 400 near the wheel/axle assembly. As far as tube 405 is concerned, where it intersects with tube 410, it is attached to a 2"×4" tube 412 that actually supports the spring axle assembly. This provides added strength. Shown at 415 are 1½" angle members which are also used to tie the base trailer together. Note, for tube 420, angle members 415, tube 410, and tubes 425, these items can be welded to tube 405. Tubes 425 can be 2" square tubes attached to help complete the rear end of the large trailer 110. Angle members 430 can be 1¼" angle tie, both 2"×2", which couple to tube 410. Tubes 410 and 425 also have another important feature attached to them. Rollers 435, which can be 2"×¾" diameter rollers, help to guide the small trailer 120 inside of the large trailer 110. Rollers of other size, location, or even a slide of some type could be used, if desired, in place of the rollers in this application.

As shown at 440, a ½" diameter tube also is used as a slide type of guide for the small trailer loading function. Its main purpose is to keep the small trailer from catching on angle 415 or tube 410 while being slid into large trailer.

A final item in FIG. 5 is end segments 445. These are continuations of the item running perpendicular to itself, eventually connecting to the upper frame in this application. For instance, tube 410 has a segment running perpendicular to itself, and attaching to tube 450 shown in FIG. 6. By doing this with the end segments, the proper gap can be created between the base and upper frames, without giving up too much strength on the edges of the trailer.

Figure 6:
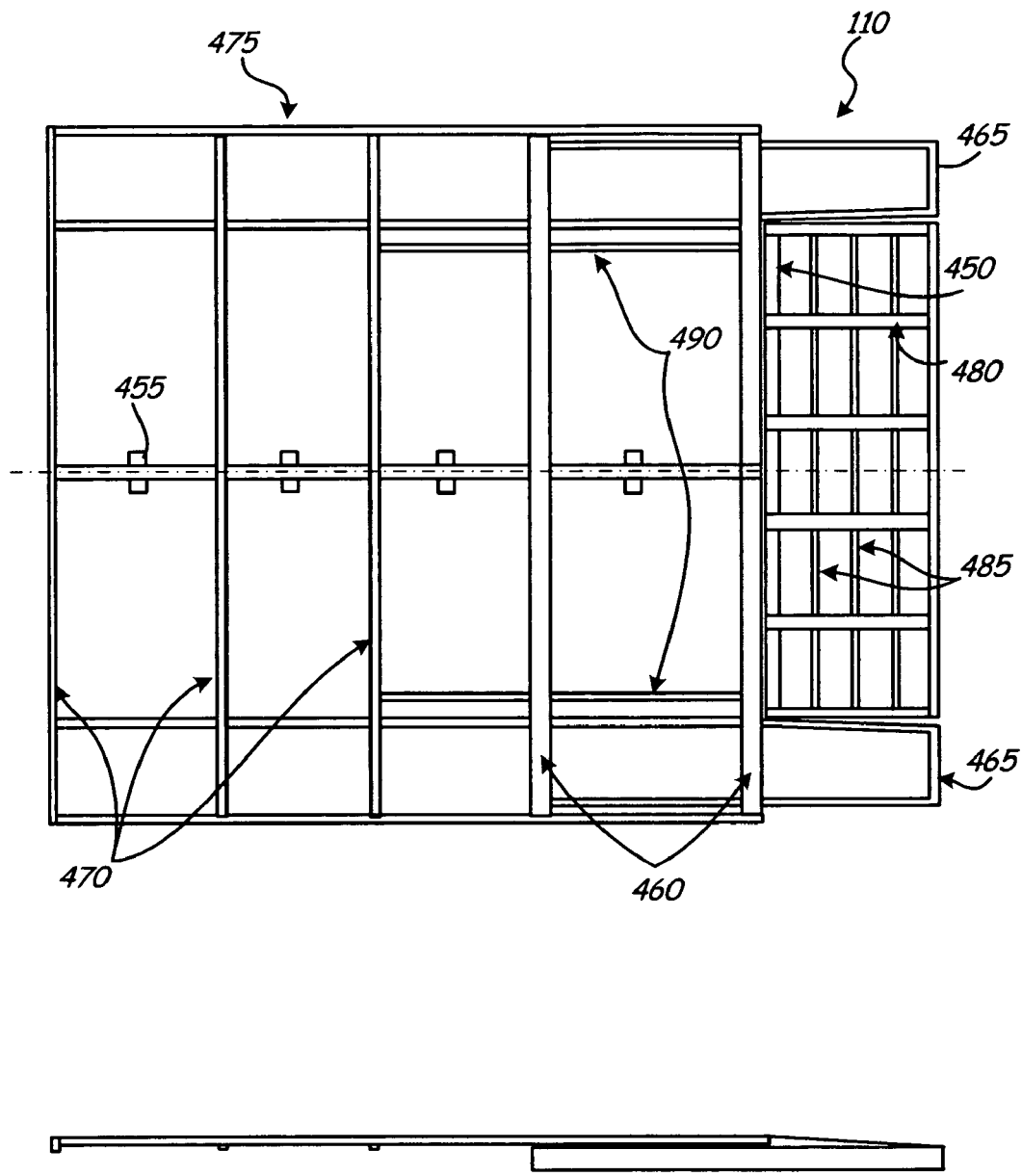
FIG. 6 is a diagrammatic illustration of other features of the larger trailer.

Referring now to FIG. 6, shown is a diagrammatic illustration of the upper frame of the large trailer 110 and some of the components used in its construction in these example embodiments. The sizes and amount of material could be reduced or increased depending on the requirements of the trailer. In an example embodiment, steel construction was used and most joints were welded.

Figure 7:
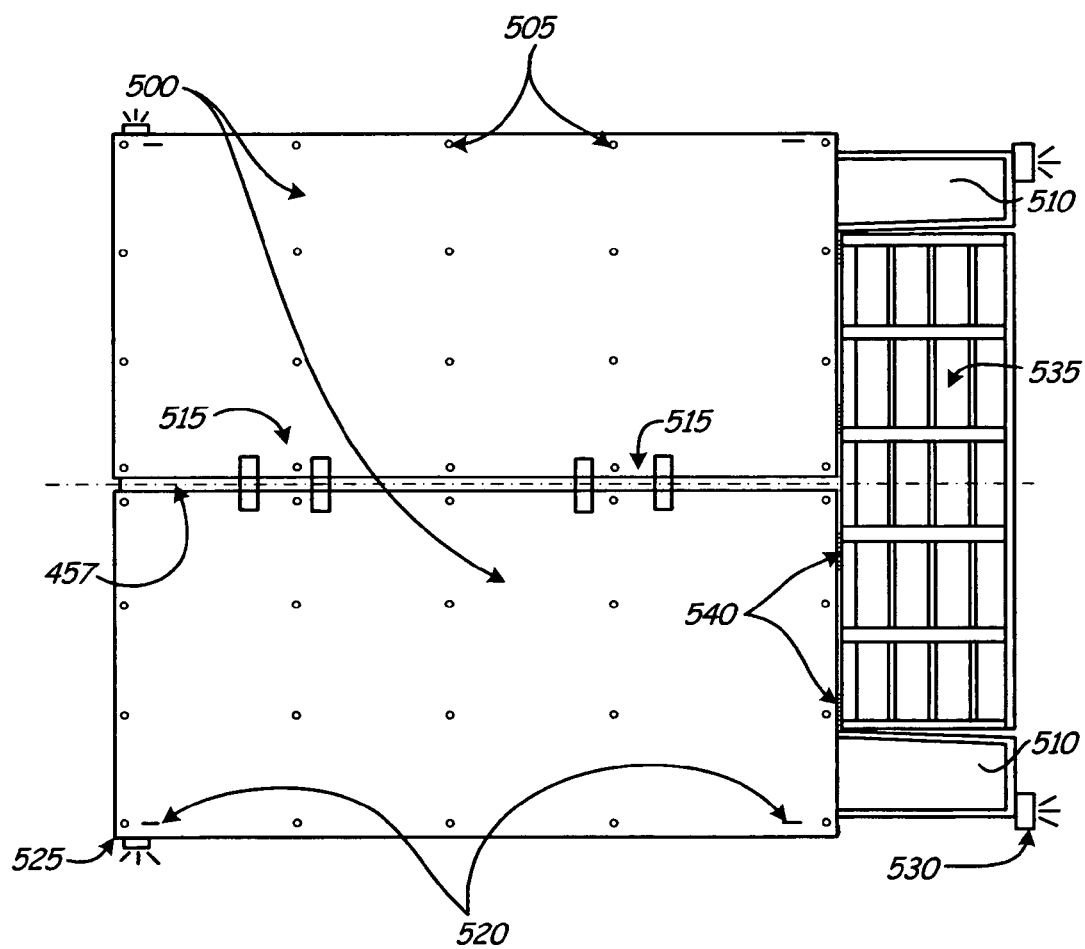
FIG. 7 is a diagrammatic illustration of still other features of the larger trailer.

As shown at 455, trailer 110 includes 2"×2" flat bars or tabs which are welded on to a 1"×2" strap holding tube 457 (shown in FIG. 7). These tabs add extra support for the plywood decking described below with reference to FIG. 7. They are also used for anchor points for the decking. As shown at 460, the trailer 110 includes a 2"×3" tube used for spanning the distance between 1"×3" tube 465 on each side of the frame. Tube 465 runs the full length of the trailer as well as forms the rear framing for the trailer. Trailer 110 also includes 1"×2" tubing 470, which comprises three 8' runs, parallel to tubes 460. These tubes make-up the base for the decking (for example, ¾" plywood) to sit on. Although tubes 470 span the distance between tubing 465 on each side of the trailer, it does have support braces which attach to the base frame shown in FIG. 5. As shown at 475, 1½" angle is used to square up the sides of the trailer and to add more support for the decking. In this application it is welded onto the ends of tubes 460 and 470.

The next four items described with reference to FIG. 6 are all used in the construction of the ramp for the large trailer. The function of this ramp is to make a smooth transition from driving up the small trailer when in its ramp function, and reaching the deck of the large trailer. Tube 450, for example a 1"×2" tube, is the main support piece of this ramp. It is attached to the large trailer 110 with four 4½"×3" hinges. As shown at 480, 1½" square tubes are welded to tube 450, and are tapered at the opposite end. As shown at 485, 1½" angle are used to run parallel to tube 450 to help support tubes 480. Flat bar (for example 1½" flat bar) is welded onto all six 1½" square tubes 480 on the tapered end.

The last item in FIG. 6 is angle 490. In this example embodiment, this is a 2"×1½" angle which runs parallel to tubing 465. These pieces of angle are used in the loading of the small trailer. It acts as a guiding surface for the 1¼" diameter roller 215 shown in FIG. 3. In an example embodiment, most items described with reference to FIG. 6 were made with steel construction and welded. The sizes and alloys used could be changed as well as whether or not they were welded or bolted together.

Referring now to FIG. 7, shown is a diagrammatic top view of the large trailer deck and associated items. Shown at 500 in FIG. 7 are two 4'×8' sheets of treated ¾" thick plywood for the trailer deck. This plywood is fastened down to the frame with ⅜" bolts 505. As shown at 510, ½" treated plywood is attached to the upper frame, tubing 465 shown in FIG. 6. In this example embodiment, ⁵⁄₁₆" bolts were used to attach the plywood. Center tie-downs are shown at 515. These type of tie-downs allow mounting plates to go over plywood 500, thus helping to better secure it to the upper frame. Outer/corner tie-downs 520 are large eyebolts bolted through deck and frame. They are located conveniently near each corner. Amber sidelights 525, and rear tail lights 530 are shown for location. In addition, three lights for this application were mounted on the underside of rear ramp cover 535. Rear ramp cover 535 is mainly for location purposes and to explain that this is covered with expanded metal for traction. Lastly, strap tube 457 (for example, 1"×2" tube) is used for two purposes:

1. To keep the winch strap guided and protected and to attach deck tabs for deck mounting as shown in drawing FIG. 6 at 455 (2"×2" flat bar).

2. Hinges 540 (for example, 4½"×3" hinges) which attach the large trailer ramp to the frame.

Figure 8:
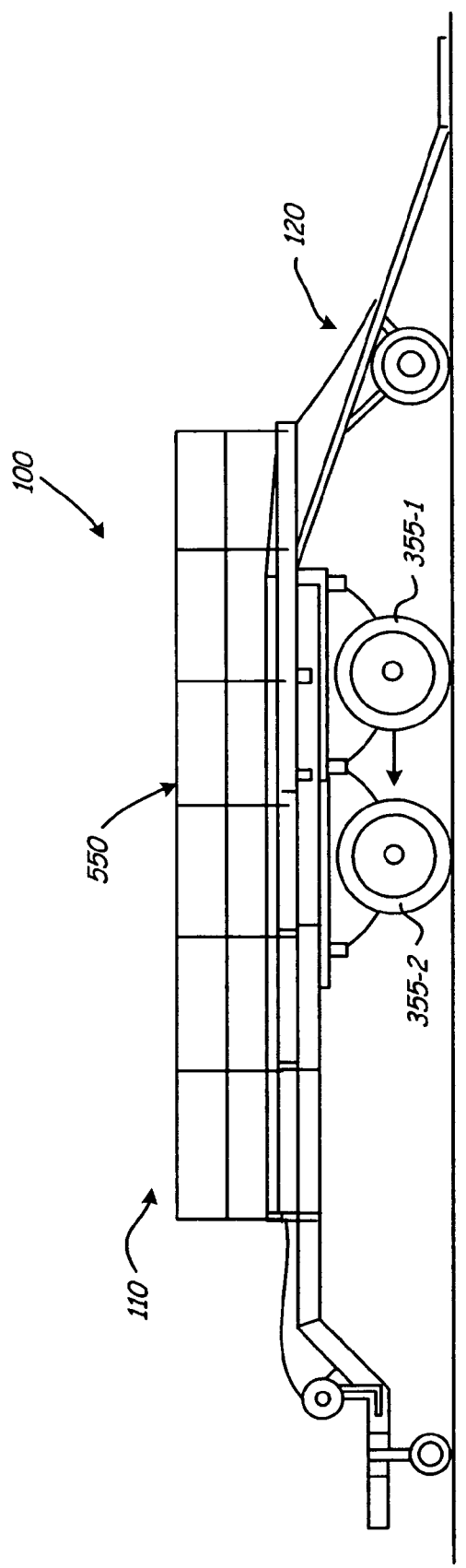
FIG. 8 is a diagrammatic side view illustration of how the smaller trailer acts as a loading ramp for the larger trailer.

Referring now to FIG. 8, shown is a diagrammatic side view of trailer apparatus 100. FIG. 8 is similar in content to FIG. 4, but also illustrates two major optional additions/changes to large trailer 110. FIGS. 4 and 5 show the wheel/axle (for example, see 355 in FIG. 4) in a rearward position. Although this design works well with large trailer, it would be recommended that to reduce tongue weight in the large trailer, the wheel/axle assembly be moved forward towards the tongue. FIG. 8 illustrates this change from old position (i.e., see reference number 355-1) to new position (see reference number 355-2). The wheel/axle assembly was moved 3' towards the tongue in the position represented by reference number 355-2 for better weight distribution. This distance could be reduced slightly if desired. This change in wheel/axle position will not in any way affect the function of the small trailer loading. The only change would be in the side view look with the small trailer loaded. The only structural change in the large trailer would be to have a longer 2"×4" tube, which is where the spring brackets are attached. A longer spring bracket could also be used instead for the front spring attachment.

Another optional additional feature shown in FIG. 8 is side and front rails 550. Rails can be used to increase safety when loading motorized vehicles onto trailer 110. For this application 1" square light tube was used for side rails, although angle or other types of tube could be used as well. These side and front rails would be attached with bolts, or welded to sides of trailer. If removable sides are desired, tube inserts could be used as well.

Two further optional/additional changes that can be made to the large trailer 110 are also described. First, torsion springs can be used instead of leaf springs, which are currently used in some embodiments of this application. The other change is that, if the wheel/axle assembly were moved forward as shown, then the tongue of the large trailer could be designed straight instead of having the shape illustrated. This would allow the overall deck height to be lowered accordingly. This is due to the fact that the clearance for the small trailer is currently built in to allow the small trailer's wheels to ride above the axle of the large trailer. If wheels were forward as shown in FIG. 8, then clearance would not be necessary thus reducing overall height of the large trailer.

Figure 9:
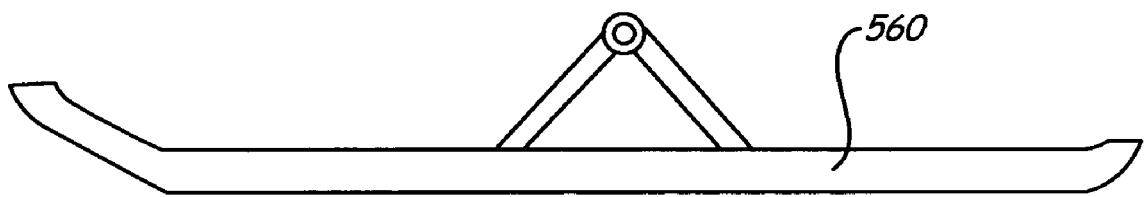
FIG. 9 is a diagrammatic illustration of a ski which can be mounted on the smaller trailer for towing behind a small vehicle.

Referring next to FIG. 9, shown is a diagrammatic illustration of an optional ski 560, which can be used in place of tires on small trailer 120. This ski works well when using small trailer 120 with snowmobiles, or in the snow with ATVs. It mounts on the ¾" axle just as the tires do. When a locking device is used for wheel/axle height control on small trailer 120, it would lock ski 560 to the desired height, including the loading position for wheels or axle in this case.

Figure 10:
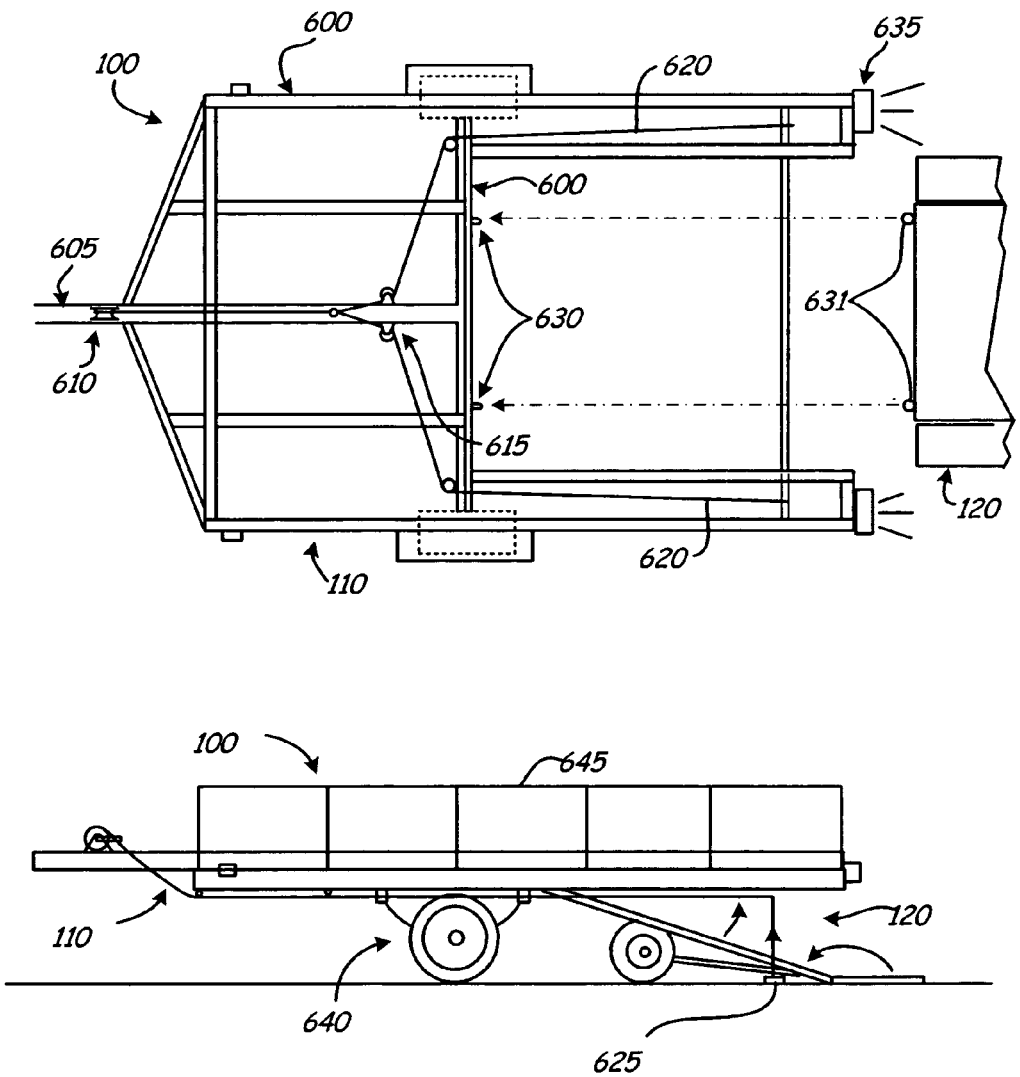
FIG. 10 shows diagrammatic illustrations of the smaller trailer fitting within a U-shape of the deck of the larger trailer, after being used as a loading ramp for the larger trailer, such that a deck of the smaller trailer forms a portion of the deck of the trailer apparatus along with the deck of the larger trailer.

Referring now to FIG. 10, provided are diagrammatic bottom and side views of large and small trailers 110 and 120 of composite trailer apparatus 100 in accordance with an alternate embodiment of the present invention. This drawing shows a single place trailer with the identical small trailer 120 as seen in previous drawings being used as a ramp. However, in this embodiment, instead of the small trailer 120 sliding inside the large trailer 110 (including under the large trailers deck), in the alternate embodiment illustrated in FIG. 10, it is shown how the smaller trailer can fit into large trailer and actually become part of the large trailer's deck. Items and descriptions are as follows. As shown at 600, 2"×3" tubes can be used for entire frame of large trailer 110. As shown at 605, a 3" square tube can be used for the large trailer's tongue. Attached to the tongue 605 is hand winch 610. This winch and cable assembly allow the raising and lowering of the small trailer 120 when unloading and for use as a ramp. This is accomplished by running cables from the winch 610 through the tongue 605 and under frame to a connecting ring. At this point, two separate cables 620 are attached and run through sheaves 615 to either side of the trailer rearward. These cables then run through another pair of sheaves and attach to 1"×2" tube 625 on either end. The length of tube 625 depends on width of large trailer.

This embodiment of the composite trailer apparatus works as follows. If small trailer 120 is attached to hooks 630 on large trailer 110 (via eyebolts 631) and in ramp mode as shown in side view of FIG. 10, the following would happen. As the winch 610 is cranked up, the retracting cables 620 which are attached to tube 625 located under the small trailer raise tube 625 towards the large trailer frame. As this happens, small trailer 120 is hoisted into final position. Safety chains (not shown in FIG. 10) can be attached from the tube 625 to trailer frame or tube 600.

To unload or use as a ramp, the reverse steps would be followed. Tail and side lights 635 show possible location for lights. In an example embodiment, 18" tires 640 are used for this large trailer 110. Side rails 645 for large trailer 110 are also provided. For front rails, 1½" square tube can be used. Also decking for front of trailer the trailer can be, for example, expanded metal, or wood.

Figure 11:
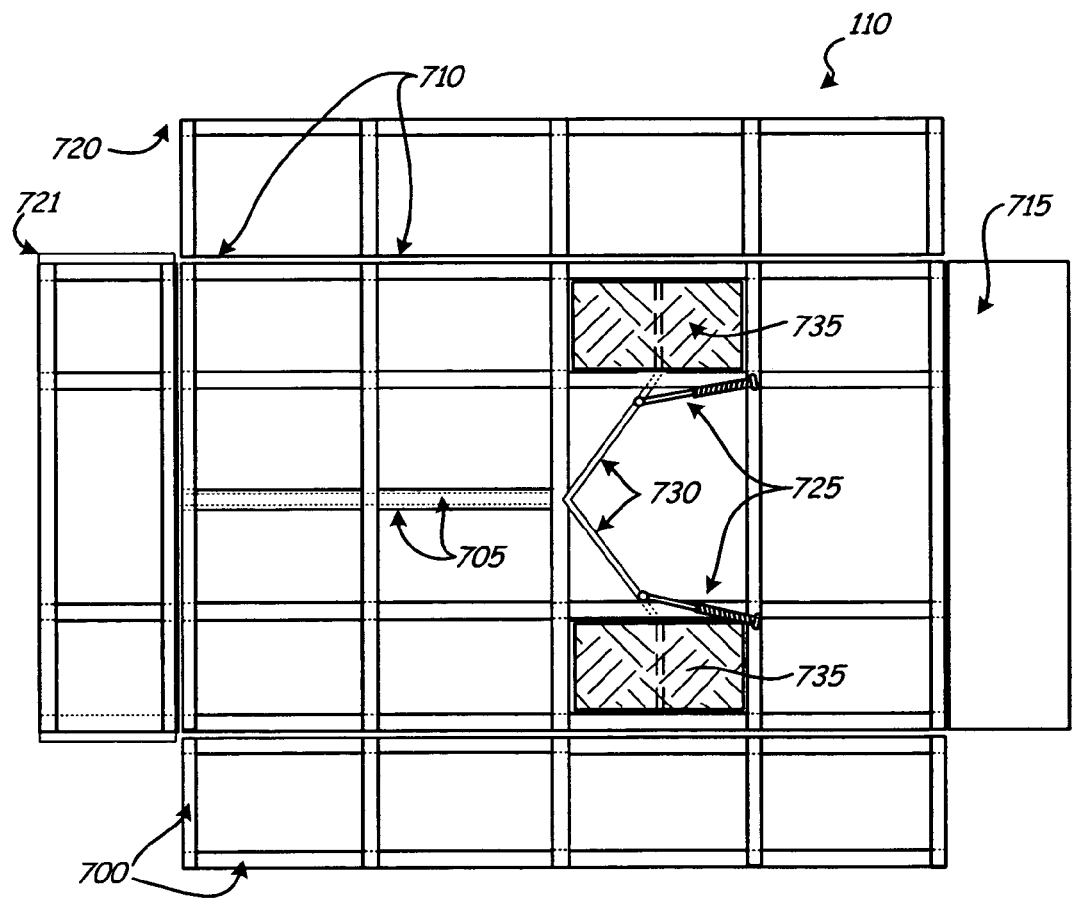
FIG. 11 is a diagrammatic illustration of certain features of the larger trailer in accordance with an alternate design of the present invention.

Referring now to FIG. 11, shown is an alternate design of small trailer 120 in accordance with some embodiments of the present invention. The basic size and/or structure is similar to the small trailer illustrated in FIGS. 1-4. It can be built out of aluminum tube 700 which is the same or similar size as described above with reference to FIG. 1. In fact, 1½ inch square tube 705 with 1¼ inch solid square tube slide out tongue, 3" hinges 710, 13"×42" aluminum plate for tailgate 715, and locking corner pins 720 and slots 721 are substantially identical to the corresponding features shown in FIG. 1.

The main differences in the two embodiments are as follows. Shown at 725 are two 500 lb. rated struts to provide more than adequate suspension for the small trailer. These two struts 725 are attached to frame 700 of trailer 120 and the attached to axles 730. Tires 735 are shown on this drawing. In this example embodiment, they are 16"×8" and the wheels are mounted on high speed hubs. These tires are larger than shown in FIG. 1. They will provide better floatation for the small trailer. Axles 730 can be ½" axles, and are similar in nature to those shown in FIG. 1, but are independent of each other at the point of attachment. This will provide more of an independent suspension for the small trailer. For added strength the axles 730 would be encased in ¾" square steel tubing (not shown in FIG. 11). This would be comparable to the axle layout in FIG. 1. The framing for this small trailer 120 as shown in FIG. 11 is welded together. If desired the frame could be bolted together as in FIG. 1.

As was the case with FIGS. 1-10, the frame and components described with reference to FIG. 11 are illustrative, and do not limit the invention to these particular components or dimensions. The small trailer deck, sides and front gate can be covered with ⅜" treated plywood or other thickness if desired. If further weight reduction is desired, then expanded aluminum can be used as was described with reference to FIG. 1. Also, aluminum diamond plate or other desired decking could be used. Since the small trailer is used as the loading ramp, it should be noted that aluminum plate would not be desired due to its slick surface. As in the description of FIG.

1, the overall size of the small trailer is in one embodiment 42"×72" when the sides, front, and rear gate are pinned together. The trailer is in this embodiment 68"×72" when in ramp mode and when loaded into large trailer 110.

Figure 12:
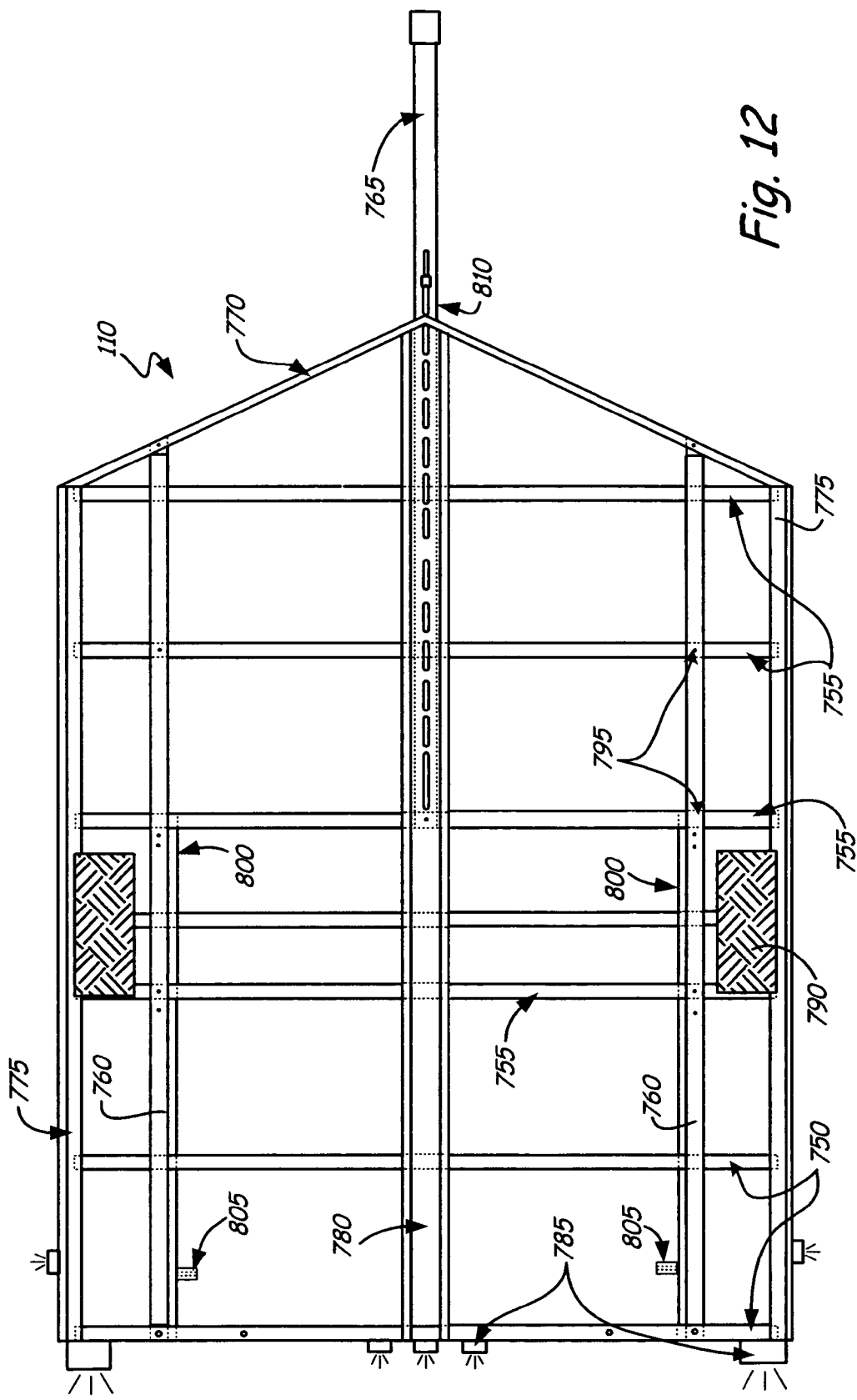
FIG. 12 is a diagrammatic illustration of other features of the larger trailer shown in FIG. 11.

Referring now to FIG. 12, shown is an alternate design for large trailer 110. The embodiments of trailer 110 shown in FIG. 12 incorporates features shown in FIGS. 5, 6 and 7. This design follows the same concepts and ideas presented in the previous FIGS. in that this large trailer is designed to easily stow the small trailer into itself. It has many of the same characteristics as the embodiments shown in the previous FIGS., but requires the installation of less rollers and does not require a winch style mechanism to pull the small trailer into the large. The design also uses the standard look trailer frame assembly for ease of construction with the unique two-in-one trailer concept.

The frame assembly comprises two 8'1½"×3" rectangle tubes 750 located in the rear of large trailer 110 followed by four 8'1½"×2" rectangle tubes 755 spaced roughly 2' apart. These tubes are steel and have a wall thickness of ⅛". They are used as cross members for the trailer frame. The main support beams 760 are in one embodiment 2"×4"×10'7". The support beams 760 carry the six cross members 750 and 755. The cross members are, in one embodiment, welded to the two main support beams 760. Note that when 1½"×3" rectangle tubes 750 are attached to the 2"×4" main supports 760, the supports should be notched 1' to allow for all cross members to remain level. The reason for using the 1½"×3" rectangle cross member tubes 750 is to provide added strength across the span between the 2"×4" rectangle support beam tubes 760.

Three of the four rectangle tubes 755 have extra support across the span being that they sit on 3"×3" square tube 765. These three cross members 755 are bolted to the square tube (tongue) 765 with ½" bolts. They could be welded or otherwise secured if so desired. The final cross member 770, for example 1¼"×2" rectangular tube, is located in the front of the trailer 110. This cross member rectangle tube 770 creates the front point of the trailer deck. Cross member rectangular tube 770 is attached to the rest of the frame at three points, including 3" angle members 775, rectangle tube 760, and square tube 765. Cross member rectangular tubes 770 secure the decking material to the frame.

The final two pieces with regard to the trailer frame are angle 775 and 1"×3"×12' rectangular tube 780 with 1"×1" c-channel attached to the outside of the 1"×3" tube. First the two 3" angles 775 with 1" angle for deck attachment are welded on top of all cross members to tie them together for the sides of the trailer. The reason for the 1" angle, which is welded to or part of the 3" angle, is to create a top plate into which the decking slides into. The same can be said for the 1"×3" rectangle tubing 780 with 1" c-channel. This is the center piece which ties all of the cross members together and runs for the full 12' of the deck. In addition, the 1" c-channels provide a slot for the decking material to be slid into. Also, the wiring for the lights 785 is run through the 1"×3" rectangle tube 780.

Other components of the embodiment of trailer 110 shown in FIG. 12 include 20.5"×8" diameter tires 790 with 3500 lb. springs and axle. A torsion type axle can be used if desired. Holes 795 (for example ⅜"×½" diameter holes) are provided and used for securing the deck, as well as for the spring shackles and to secure the tongue to the cross members. Shown at 800 is 1"×2" J-channel attached to rectangle tube 760 to create a track for the small trailer to be loaded into the deck's underside. This will be further described with reference to FIGS. 13 and 14.

Another component shown is the 1½" diameter×2½" rollers 805 which are mounted to the rectangle tubes 760. These rollers are used in the loading procedure for the small trailer 120. They guide and support the small trailer 120 when it is loaded into the larger trailer 110. Lights 785 (side, running, and tail) simply show possible location for mounting, but other locations can be chosen as well. The final component of this drawing is a spring loaded locking device and handle, shown together at reference number 810. This device has a handle located on the tongue of the trailer attached with a cable to a spring loaded pin at the rear of the tongue. This pin locks the small trailer to the large when released. This will be further shown in FIG. 15. The specific configurations, dimensions, materials, etc described with reference to FIG. 12 are do not limit the invention to these examples, but simply show one of many possible configurations to allow the two trailers to become one for towing purposes.

Figure 13:
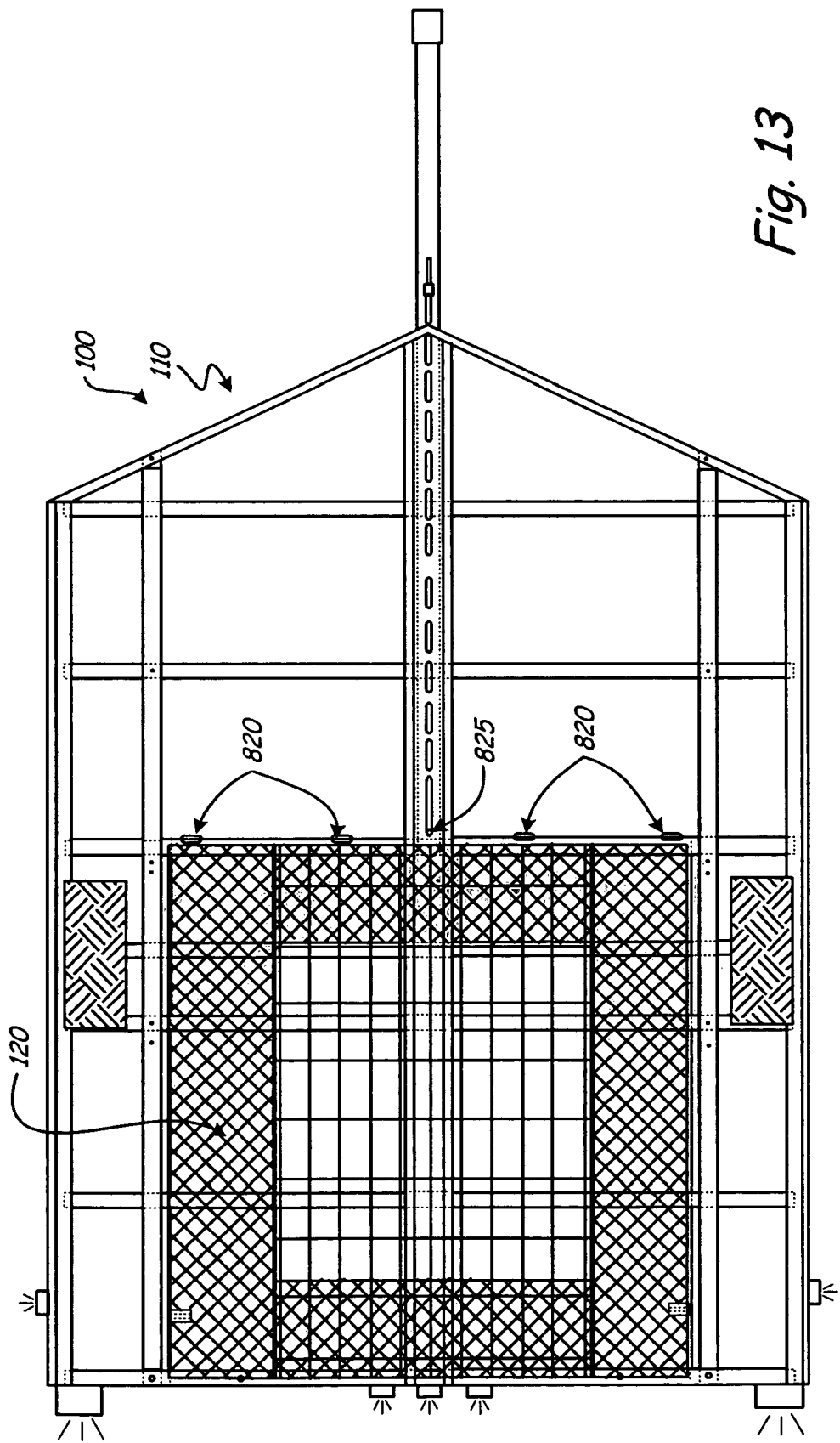
FIG. 13 is a diagrammatic illustration of the smaller trailer fitting into the larger trailer of the design shown in FIGS. 11 and 12.

Referring now to FIG. 13, shown is composite trailer 100 while illustrating the placement of the small trailer 120 when loaded inside the large trailer 110. Small trailer 120 is shown with its sides folded down (out), and its front and rear gate folded on top of its deck. Shown at 820 is rolling angle bracket in the loaded position attached to small trailer 120 at four points. This is described and shown in greater detail in FIG. 14. This view simply illustrates its position and where the pins attach it to small trailer. These pins are the same pins which attach to the corners of the small trailer 120 when it is being used as a stand alone trailer. This bracket also remains attached to small trailer while it is being used as a ramp for the large trailer 110. Shown at 825 is the tab located on the rolling bracket which is then locked in place by the spring loaded pin on the large trailer 110. This secures the small trailer 120 inside the large trailer 110. In addition, there can be two straps located at the rear of the large trailer which are not shown in this drawing. These in addition to the locking pin firmly secure the small trailer 120 inside of the large trailer 110.

Figure 14:
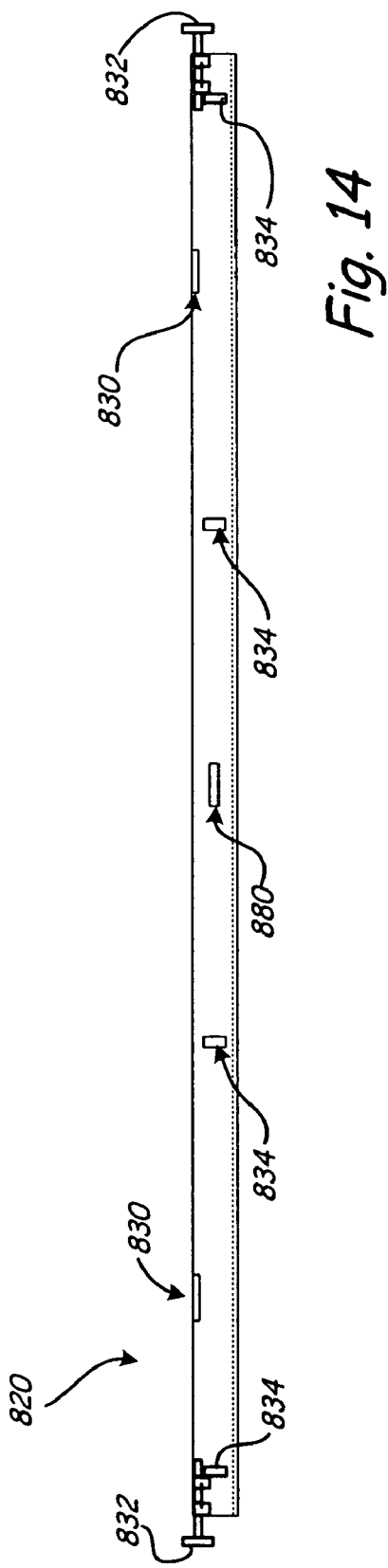
FIG. 14 is a diagrammatic illustration of a rolling angle bracket which attaches to the smaller trailer for loading purposes.

Referring now to FIG. 14, shown is a close up front view of the rolling angle bracket 820 shown in FIG. 13. This bracket serves three functions with regard to the small trailer 120 shown in FIG. 12. The first is that since the bracket is a 2" angle with 3/16" wall thickness, it provides a rigid support when the small trailer 120 is folded into the ramp or loading position. This is important due to the fact that the small trailer sides are folded down flat and would not allow proper rigidity across the width of the 68" making for an unstable ramp or a tendency to droop when loaded in the large trailer 110. The second function is that when the small trailer is used as a ramp, this bracket provides a kind of mounting point for pinning the rear of small trailer to the rear of the large trailer. Shown at 830 are 2"×⅜" tabs ¾" diameter center hole to accept pins. These two tabs 830 rest on top of the deck of the large trailer 110 and ⅝" pins are inserted through the tabs and into the deck and rear cross member of the large trailer. This effectively secures the small trailer for use as a ramp for loading the large trailer. It also provides a 68" wide ramp which is more than adequate for an ATV, snowmobile, etc. With the bracket attached to the small trailer, this ramp method could be used for side loading the large trailer as well.

Shown at 832 are rollers and mounts attached to the angle bracket 820 which ride on the J channel 800 shown in FIG. 12. Shown at 880 is a tab attached to angle bracket 820, to create a locking mechanism when used in conjunction with locking pin 885 shown in FIG. 16. Locking pin 885 and tab 880 are described further below with reference to FIG. 16. Shown at 834 are four slots provided in angle bracket 820 which allow attachment to small trailer 120 at points of reference shown in conjunction with angle bracket 820 and secured with locking pins 320 shown in FIG. 3.

Figure 15:
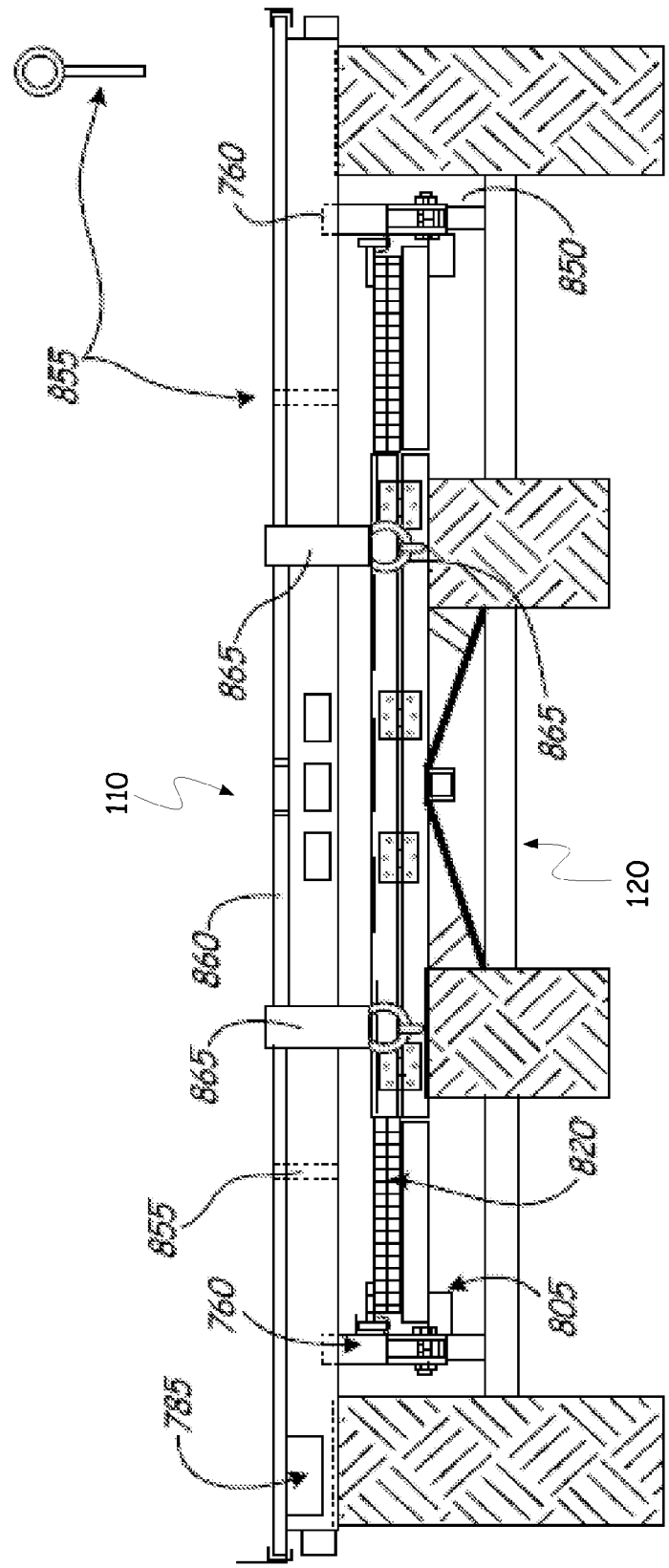
FIG. 15 is a diagrammatic rear view of the smaller trailer when fit within the larger trailer.

Referring now to FIG. 15, shown is a view from behind the trailer combined trailer 100 with the small trailer 120 in its loaded position in larger trailer 110. As shown at 805, the rollers described with reference to FIG. 12 are shown to illustrate how they are used with the small trailer 110. These rollers 805 are bearinged and sealed so they are very resilient to the elements. They make loading the small trailer very easy, although if desired, a fixed skid type plate could be used. The rolling angle bracket 820 is shown although it is important to note that is located six feet inside the trailer when small trailer is in this position. In fact the bracket 820 would be in a higher position due to the fact that the J-channel on which it rides slightly inclines as it runs from the rear of the large trailer to the front. The reason for this incline is to add distance between the ground and the small trailer tires. The J-channel could be run flat if smaller wheels or skies were on the small trailer. Lights 785 are shown for illustrative purposes as possible positions of running, side, and tail lights.

As shown at 760, 2"×4" rectangle tubes (support beams) are shown in relation to the springs and axles 850 (for example, 3500 pounds) on the large trailer 110. The J-channel as well as the rollers 805 are mounted on them. Actually the rollers 805 are mounted off of a 1½"×3" rectangle tube which in turn is welded to the bottom of the 2"×4" rectangle tube. Two ¾" diameter holes 855 for the ramp function are shown. They run through the decking material 860 as well as the cross member. When in ramp mode the ⅝" diameter pins need to be removed and reinserted through the tabs on the rolling angle bracket 820 and back into the deck and cross member. This creates two points where the small and large trailer are securely joined to form a ramp. As shown at 865, tie down straps are shown for location purposes. The idea for using two straps is to slightly pick up the center portion of the small trailer and to lock it in a position where it is level. Also the straps 865 would make up the second and third points which lock the small trailer inside of the large trailer. The straps attach to the small trailer at 6" in from the corners of the 42" small trailer deck. At these points, there are ½" diameter holes on the underside of the 1½" square aluminum tube to insert the strap hook. As far as the large trailer attachment points for the straps 865 for this application, two ½" diameter holes were drilled into the deck plate. A number of other options are available for this.

A final note on this drawing: When the small trailer 120 is loaded inside of the large trailer 110, the small trailer tires are positioned about 1½" from the axle of the large trailer. With this spacing between the wheel (tire) and axle one could not interfere with the other. Also there is good clearance between the small trailer tire and the ground, and with the position of the small trailer tire to the large trailer axle, there should be no chance that these tires would make contact with the ground under normal driving conditions.

Figure 16:
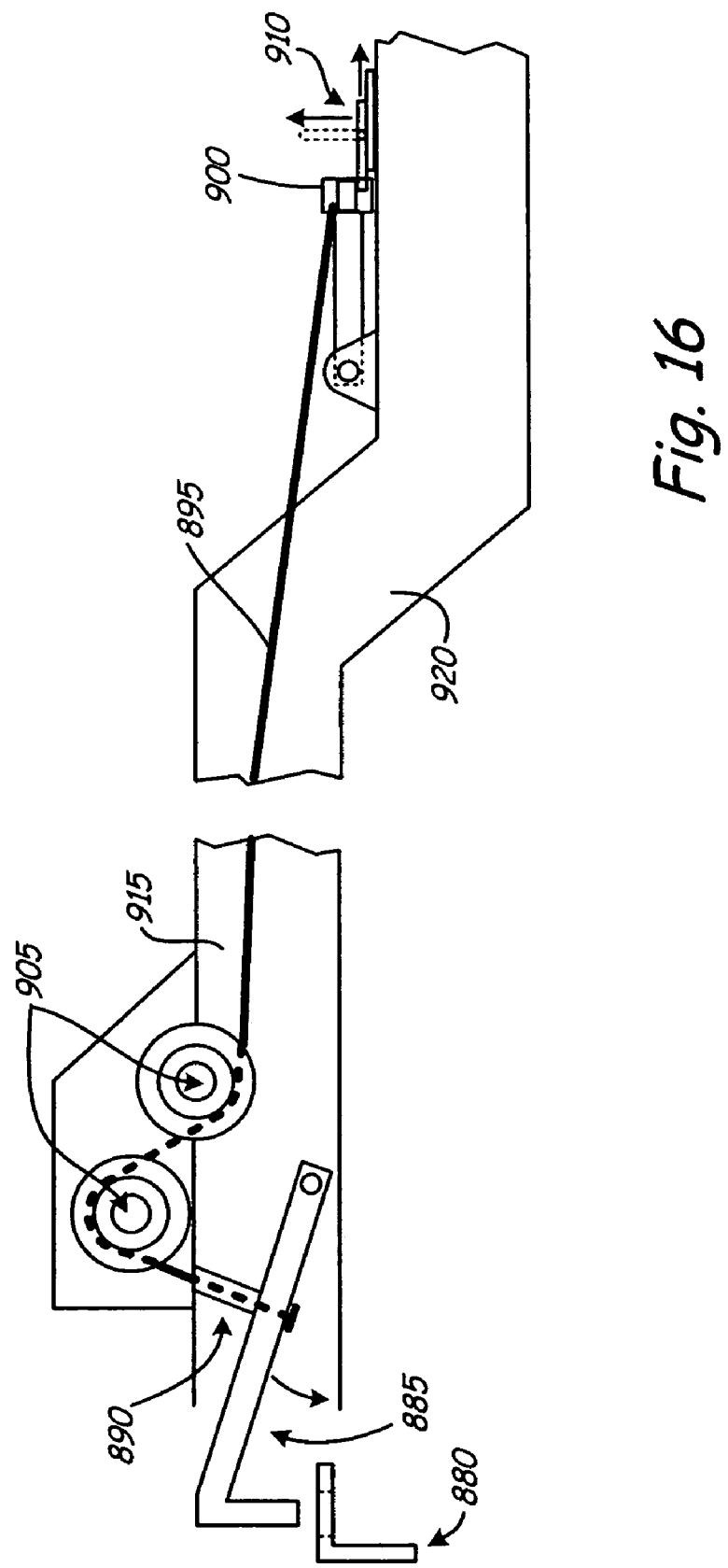
FIG. 16 is a diagrammatic illustration of a locking device.

Referring now to FIG. 16, shown is a diagrammatic illustration of both the locking device pin mechanism and the locking device release handle starting with the locking device mechanism and pin. Tab 880 is mounted on the rolling angle bracket 820. This tab is attached to the center of the rolling angle bracket. It is a 2" angle with ⅜" wall thickness. It also has a 1" diameter hole in the tab into which the locking pin inserts when the handle is released. Locking pin 885 and its downward movement is shown in FIG. 16. Spring 890 for locking pin 885 is shown in the retracted position with the ⅛" diameter cable 895 running through the spring and locking pin. When the locking device handle 900 is released, the pin 885 snaps downward and in turn locks the rolling angle bracket to the large trailer. This view shows the 3"×3" square tube (tongue) as if the sides were open. All components in the back section tongue are actually located inside the 3"×3" square tube or in the small box located on the top of the tongue. This is where the sheaves 905 for cable 895 are located. These are two 1¼" diameter sheaves enclosed for protection from the elements as well as the spring 890, cable 895, and locking pin 885. The end of the locking pin 885 and rolling angle bracket 880 are exposed to allow for each other to work together to lock the trailer in place.

Moving to the front 3"×3" square tube (tongue) section, there is first the locking device handle 900. The arrow shows the directional movement to release the locking pin 885 which locks the small trailer in place. Shown at 910 is slide locking pin for the release handle, which serves an important role. This pin 910, when slid into the end of the release handle 900, holds the handle towards the top of the tongue surface. In this position the locking pin 885 is retracted and the small trailer can be easily slid in or out of the large trailer. When slide locking pin 910 is released, the handle 900 will rotate into a standing position, thus allowing the locking pin 885 to release and lock the small trailer in place.

Lastly the locking pin 885 is held inside of a back section 915 of the tongue. In an example embodiment, the tongue is a 3"×3" square tube with a ⁵⁄₁₆" bolt run through the tube and pin. The sheaves 905 are held in position with ⅜" bolts. The handle 900 is also held by a ⁵⁄₁₆" bolt at a front section 920 of the tongue. The locking device handle 900 is actually ⅝" pipe with a cup screwed on to the end of the pipe to lock cable 895. The locking device pin is a solid ⅝" diameter piece of round stock with a ⅜" diameter hole and bolt at one end which secures it in side the 3"×3" square tube. Spacers or washers can be used to keep it centered. This locking pin device, when used with the straps on the rear of the large trailer, will more than keep the small trailer in place until it is desired to be removed.

Figure 17:
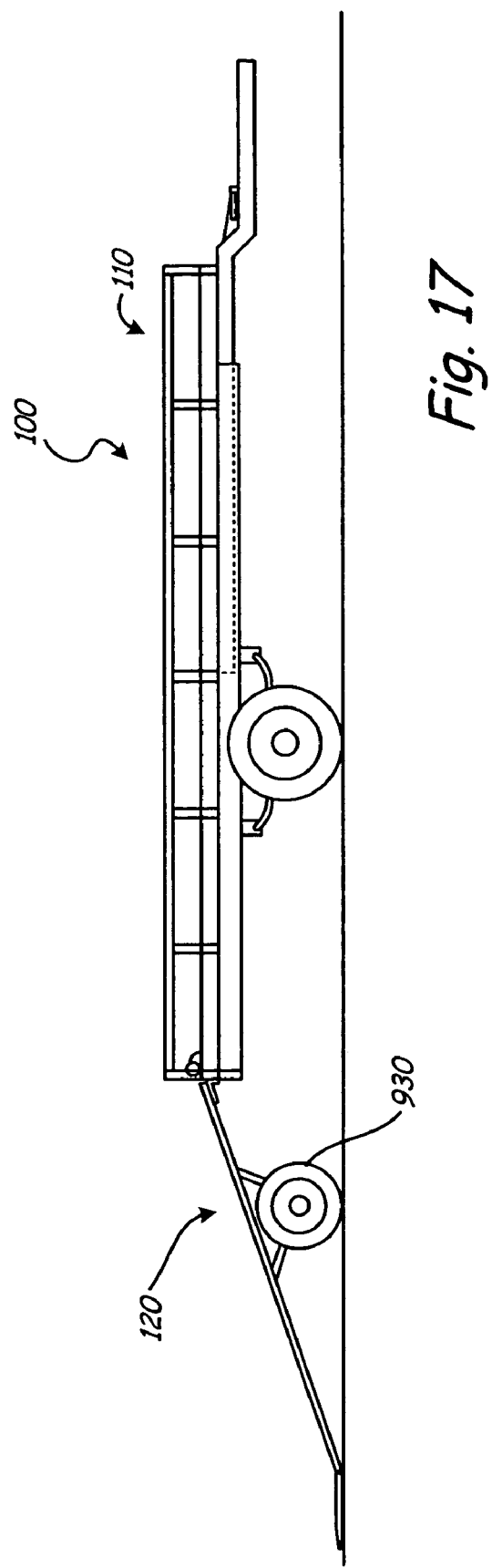
FIG. 17 is a diagrammatic side view illustration of the smaller trailer functioning as a ramp for the larger trailer.

Referring now to FIG. 17, shown is a diagrammatic illustration of how the two trailers 110 and 120 become one (combined trailer 100) when the small trailer 120 is used as a ramp for the large trailer 110. As shown in the drawing, the small trailer wheels 930 also pick up some of the weight for whatever is being loaded onto the large trailer 110. This is true of the other design described in early drawings.

Overall the design shown in FIGS. 11-17 provide some advantages over the design illustrated in FIGS. 1-10, although both designs work extremely well. The same basic concept is used as well. This being two trailer becoming one for towing purposes behind a motorized vehicle. The main advantage the new design has is that it is built along the same lines as most trailers with regards to the large trailer. Also this new design has only two fixed rollers vs. sixteen on the original. This greatly reduces the possibility of rollers becoming froze up from road debris when being towed on the road. Just as stated in earlier descriptions both trailers could have different parts or materials to achieve the same result and would not reduce the scope of this invention. Also this design concept could also be used with an enclosed large trailer or with sides or not. It is possible with regards to overall size that a single place large could be built with a small trailer under its deck. This would be true with a four place trailer as well.

Figure 18:
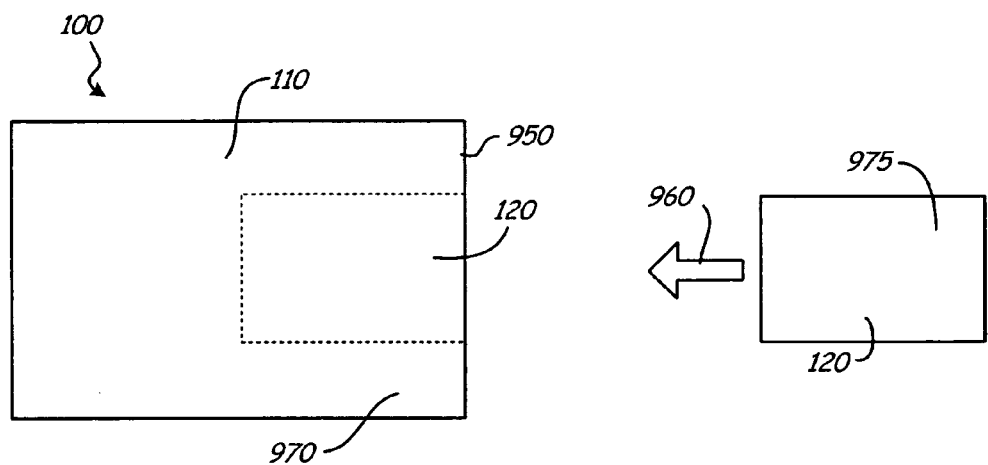
FIGS. 18 and 19 are diagrammatic top view illustrations of the trailer apparatus illustrating the smaller trailer fitting into the larger trailer such that it is positioned substantially within a footprint of the larger trailer.
Figure 19:
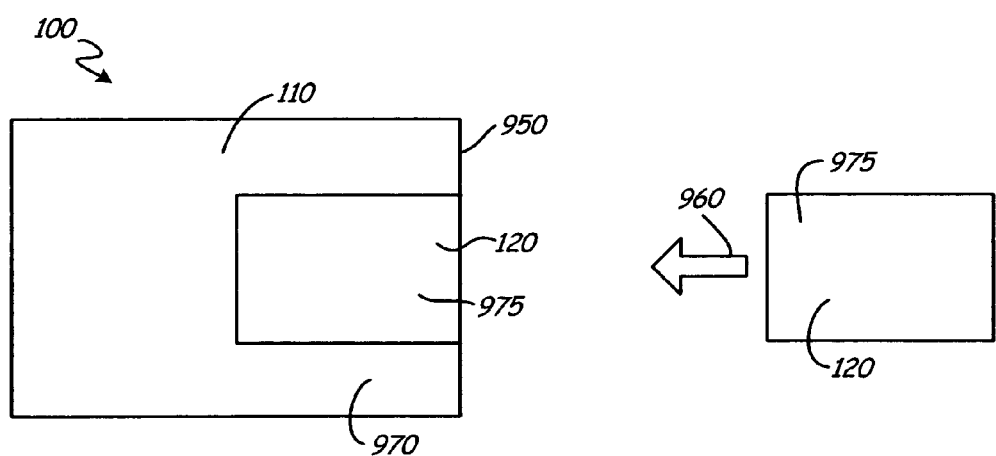

Referring now to FIGS. 18 and 19, shown are diagrammatic top views illustrating how the smaller trailer 120 fits substantially within a footprint of the larger trailer 110. In both FIGS., trailer 120 is shown on the right separate from larger trailer 110, with arrow 960 representing movement of trailer 120 such that it fits into trailer 110. In FIG. 18, trailer 120 fits into trailer 110 by attaching to the larger trailer substantially underneath its deck 970. Since the deck 975 of the smaller trailer 120 is substantially underneath the deck 970 of the larger trailer 110, it is represented with dashed lines in FIG. 18. In FIG. 19, trailer 120 fits into trailer 110 by forming part of the deck for the combined trailer 100. Since the deck 975 of the smaller trailer 120 fits within the U shape of the deck 970 of larger trailer 110 to form a combined deck, it is shown with solid lines in FIG. 19. In either embodiment, whether the deck 970 of larger trailer 110 is rectangular or U-shaped, it can be observed that its footprint 950 is a rectangular shape having a length and width substantially equal to a length and width of the larger trailer 110. It must be noted that trailer 110 need not be completely rectangular in all embodiments, and that trailer 120 can extend slightly outside the footprint 950 while still being considered to be substantially within the footprint of trailer 110.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the trailer apparatus, while maintaining substantially the same functionality without departing from the scope and spirit of the present invention.

What is claimed is:

1. A trailer apparatus configured to be pulled behind a first vehicle, the trailer apparatus comprising:
    a first trailer configured to be pulled behind the first vehicle and being of a size suitable for hauling a second smaller vehicle, the first trailer being a first two-wheel trailer configured to have only two wheels in contact with a rolling surface along which the first trailer is pulled behind the first vehicle; and
    a second trailer configured to fit into the first trailer by attaching to the first trailer substantially underneath a deck of the first trailer such that the second trailer is also pulled along with the first trailer, wherein the second trailer is a second two-wheel trailer having only two wheels, wherein when the second trailer is attached to the first trailer substantially underneath the deck of the first trailer the two wheels of the second trailer are suspended such that the two wheels of the second trailer are exposed to, but off of, the rolling surface along which the first trailer is pulled behind the first vehicle, wherein the trailer apparatus is configured such that the second trailer is removed from the first trailer at a rear end of the first trailer opposite a front end of the first trailer which is configured to be coupled to the first vehicle, wherein the second trailer includes a slide out tongue and a locking mechanism for locking the slide out tongue in a retracted position when the second trailer is attached underneath of the deck of the first trailer or for locking the slide out tongue in an extended position, the second trailer also including a coupler at a distal end of the slide out tongue, thereby allowing the second trailer to be pulled behind the second smaller vehicle as a stand alone trailer when the slide out tongue is in the extended position, the second trailer also comprising a front gate, a rear gate and a first and second sides, the front gate, the rear gate and the first and second sides of the second trailer being configured to be moveable to an up position when the second trailer is removed from the first trailer and being configured to be moveable from the up position in preparation for the second trailer being attached to the first trailer substantially underneath the deck of the first trailer.

2. The trailer apparatus of claim 1, wherein the second trailer is configured to form a ramp for the first trailer to aid in loading the first trailer.

3. The trailer apparatus of claim 1, wherein the second trailer is a stand-alone trailer which is smaller than the first trailer, the trailer apparatus being configured such that the second trailer fits substantially within a footprint of the first trailer while the first trailer is being pulled behind the first vehicle.

4. The trailer apparatus of claim 3, wherein the trailer apparatus is configured such that the second trailer fits substantially within the footprint of the first trailer by coupling to the first trailer under a deck of the first trailer.

5. The trailer apparatus of claim 3, wherein the footprint of the first trailer is a rectangular shape having a length and a width approximately equal to a length and a width of the first trailer.

6. A trailer apparatus configured to be pulled behind a first vehicle, the trailer apparatus comprising:
    a first trailer configured to be pulled behind the first vehicle and being of a size suitable for hauling a second smaller vehicle, the first trailer comprising:
        a first trailer tongue configured to couple the first trailer to the first vehicle;
        a first trailer deck; and
        at least two first trailer wheels configured to be in contact with a rolling surface along which the first trailer is pulled behind the first vehicle; and
    a second trailer which is a two-wheel trailer having only two wheels, the second trailer being attachable underneath the deck of the first trailer such that the second trailer is also pulled along with the first trailer behind the first vehicle, the second trailer comprising:
        a second trailer slide out tongue and a locking mechanism configured to lock the slide out tongue in a retracted position when the second trailer is attached underneath of the deck of the first trailer or for locking the slide out tongue in an extended position when the second trailer is detached from underneath the deck of first trailer;
        a coupler at a distal end of the second trailer slide out tongue, thereby allowing the second trailer to be pulled behind the second smaller vehicle as a stand alone trailer when the slide out tongue is in the extended position;
        the two wheels of the second trailer;
        a second trailer deck;
        a front gate extendable upward away from the two wheels of the second trailer;
        a rear gate extendable upward away from the two wheels of the second trailer;
        a first side extendable upward away from the two wheels of the second trailer between the front gate and the rear gate;
        a second side extendable upward away from the two wheels of the second trailer between the front gate and the rear gate;
        wherein the front gate, the rear gate and the first and second sides of the second trailer are configured to be moveable to an up position when the second trailer is detached from underneath the deck of first trailer, and are configured to be moveable from the up position when the second trailer is to be attached to the first trailer substantially underneath a deck of the first trailer;

wherein the first trailer is further configured to facilitate the second trailer being removed from underneath the deck of the first trailer at a rear end of the first trailer opposite the tongue of the first trailer; wherein when the second trailer is attached to the first trailer underneath the deck of the first trailer the first and second trailers are so disposed and arranged that the two wheels of the second trailer are suspended such that they are exposed to, but off of, the rolling surface along which the first trailer is pulled behind the first vehicle.

7. The trailer apparatus of claim 6, wherein the first trailer is also a two-wheel trailer having only two first trailer wheels.

8. The trailer apparatus of claim 6, wherein the front gate, rear gate, and first and second sides of the second trailer are attached to the second trailer using hinges.

9. The trailer apparatus of claim 8, wherein the front gate, rear gate, and first and second sides of the second trailer are attached in the up position using locking pins.

* * * * *

UNITED STATES PATENT AND TRADEMARK OFFICE
CERTIFICATE OF CORRECTION

PATENT NO. : 7,625,166 B2
APPLICATION NO. : 11/065528
DATED : December 1, 2009
INVENTOR(S) : Gerald L. Olson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Twenty-sixth Day of October, 2010

David J. Kappos
*Director of the United States Patent and Trademark Office*